United States Patent
Hasegawa

(10) Patent No.: US 10,235,071 B2
(45) Date of Patent: Mar. 19, 2019

(54) TIERED STORAGE SYSTEM, STORAGE CONTROLLER AND TIERING CONTROL METHOD

(71) Applicants: KABUSHIKI KAISHA TOSHIBA, Minato-ku (JP); TOSHIBA DIGITAL SOLUTIONS CORPORATION, Kawasaki-shi (JP)

(72) Inventor: Tomofumi Hasegawa, Inagi (JP)

(73) Assignees: KABUSHIKI KAISHA TOSHIBA, Minato-ku (JP); TOSHIBA DIGITAL SOLUTIONS CORPORATION, Kawasaki-shi (JP)

( * ) Notice: Subject to any disclaimer, the term of this patent is extended or adjusted under 35 U.S.C. 154(b) by 61 days.

(21) Appl. No.: 15/453,191

(22) Filed: Mar. 8, 2017

(65) Prior Publication Data
US 2018/0150250 A1    May 31, 2018

(30) Foreign Application Priority Data
Nov. 29, 2016    (JP) .................................. 2016-231202

(51) Int. Cl.
  *G06F 12/00*  (2006.01)
  *G06F 13/00*  (2006.01)
  *G06F 3/06*  (2006.01)
(52) U.S. Cl.
  CPC .......... *G06F 3/0622* (2013.01); *G06F 3/0647* (2013.01); *G06F 3/0659* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 9,996,294 B2 * | 6/2018 | Koester | ................. G06F 3/0685 |
| 2008/0244502 A1 | 10/2008 | Goto | |
| 2009/0222778 A1 | 9/2009 | Goto | |
| 2011/0022645 A1 * | 1/2011 | Maeda | ................. G06F 11/1004 707/822 |
| 2011/0196987 A1 * | 8/2011 | Benhase | ............... G06F 3/0608 709/247 |
| 2013/0138884 A1 | 5/2013 | Kawamura | |
| 2013/0179636 A1 | 7/2013 | Shirasu et al. | |
| 2013/0246724 A1 | 9/2013 | Furuya | |
| 2013/0262533 A1 | 10/2013 | Mitra et al. | |

(Continued)

FOREIGN PATENT DOCUMENTS

| | | |
|---|---|---|
| JP | 4-90034 A | 3/1992 |
| JP | 6-139297 A | 5/1994 |

(Continued)

*Primary Examiner* — Sean D Rossiter
(74) *Attorney, Agent, or Firm* — Oblon, McClelland, Maier & Neustadt, L.L.P.

(57) ABSTRACT

According to one embodiment, a tiered storage system includes a first storage device, a second storage device and a storage controller. The storage controller determines, when a range of an access request to a logical unit extends over some of logical extents in the logical unit, that these logical extents are correlated with each other. The storage controller transfers data of a set of the correlated logical extents as one extent group collectively in units of physical extents between the first storage device and the second storage device.

7 Claims, 24 Drawing Sheets

(56) References Cited

U.S. PATENT DOCUMENTS

| | | | |
|---|---|---|---|
| 2013/0290648 A1* | 10/2013 | Shao | G06F 12/04 |
| | | | 711/154 |
| 2014/0025990 A1* | 1/2014 | Akutsu | G06F 11/1092 |
| | | | 714/6.22 |
| 2014/0173337 A1 | 6/2014 | Igashira et al. | |
| 2014/0281350 A1* | 9/2014 | Lango | G06F 3/0665 |
| | | | 711/203 |
| 2014/0297964 A1 | 10/2014 | Nakase | |
| 2014/0297983 A1 | 10/2014 | Takeda et al. | |
| 2014/0344518 A1 | 11/2014 | Kawaba | |
| 2015/0234719 A1* | 8/2015 | Coronado | G06F 11/203 |
| | | | 714/6.3 |
| 2015/0253994 A1 | 9/2015 | Takada et al. | |
| 2015/0277767 A1 | 10/2015 | Hamano et al. | |
| 2016/0041776 A1 | 2/2016 | Inoue | |
| 2016/0196075 A1* | 7/2016 | Matsushita | G06F 12/0246 |
| | | | 711/103 |
| 2016/0371001 A1* | 12/2016 | Kikuchi | G06F 3/0604 |
| 2016/0378773 A1* | 12/2016 | Vaghani | G06F 3/06 |
| | | | 711/114 |
| 2017/0269840 A1* | 9/2017 | Hasegawa | G06F 3/0605 |
| 2017/0336994 A1* | 11/2017 | Jain | G06F 3/0619 |
| 2018/0032398 A1 | 2/2018 | Hasegawa | |
| 2018/0032432 A1* | 2/2018 | Kowles | G06F 3/0619 |

FOREIGN PATENT DOCUMENTS

| | | |
|---|---|---|
| JP | 9-297699 A | 11/1997 |
| JP | 2000-132711 A | 5/2000 |
| JP | 2003-85221 A | 3/2003 |
| JP | 2008-250636 A | 10/2008 |
| JP | 2009-205523 A | 9/2009 |
| JP | 2009-258911 A | 11/2009 |
| JP | 2013-114671 A | 6/2013 |
| JP | 2013-196290 A | 9/2013 |
| JP | 2013-206467 A | 10/2013 |
| JP | 5362145 B1 | 12/2013 |
| JP | 2014-119831 A | 6/2014 |
| JP | 2014-154044 A | 8/2014 |
| JP | 2014-199596 A | 10/2014 |
| JP | 2014-228946 A | 12/2014 |
| JP | 2015-170160 A | 9/2015 |
| JP | 5797848 B1 | 10/2015 |
| JP | 2015-191628 A | 11/2015 |
| JP | 2017-167819 A | 9/2017 |
| JP | 2018-22222 | 2/2018 |
| WO | WO 2013/103003 A1 | 7/2013 |
| WO | WO 2015/162766 A1 | 10/2015 |
| WO | WO 2015/194033 A1 | 12/2015 |
| WO | WO 2016/020977 A1 | 2/2016 |

\* cited by examiner

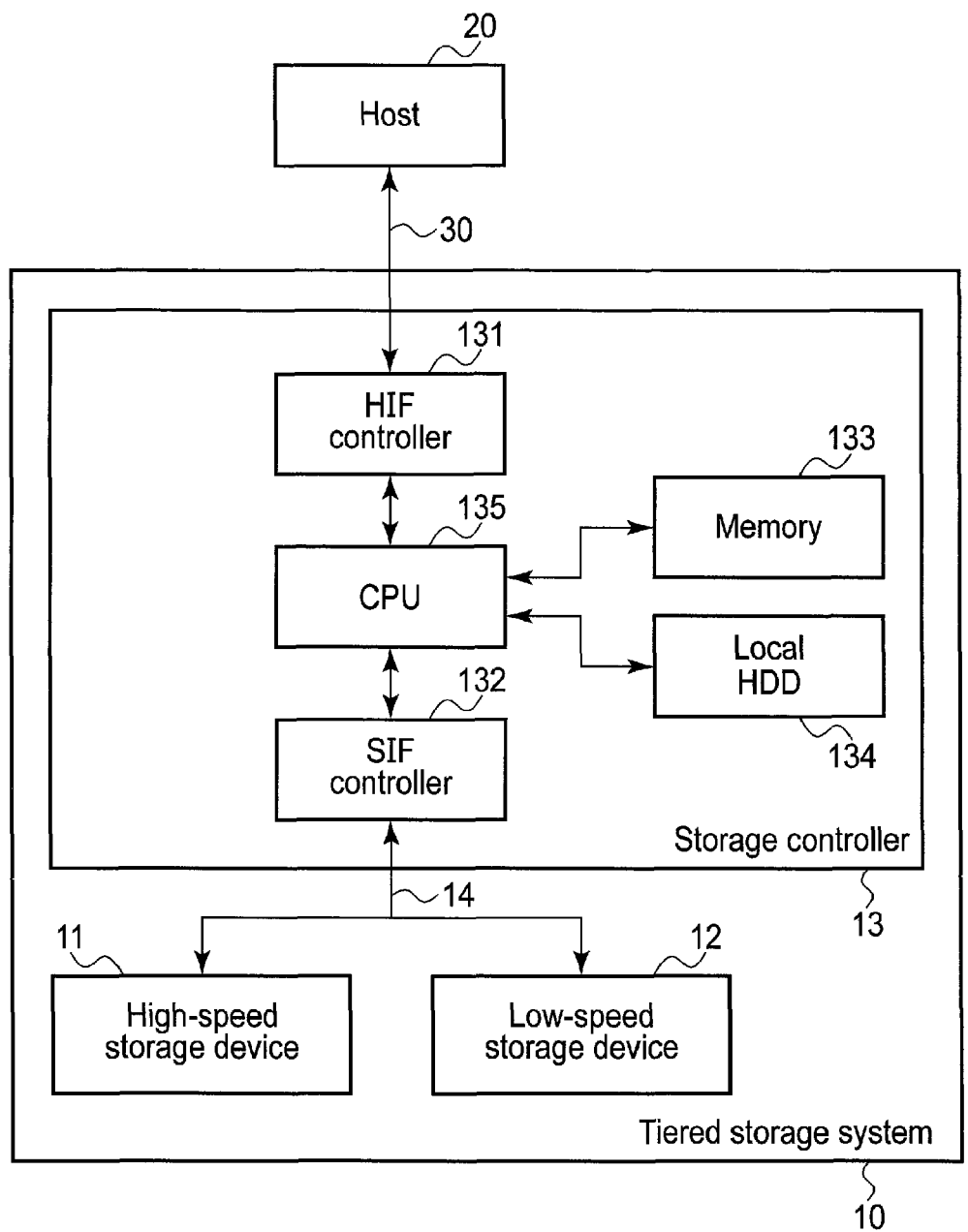
F I G. 1

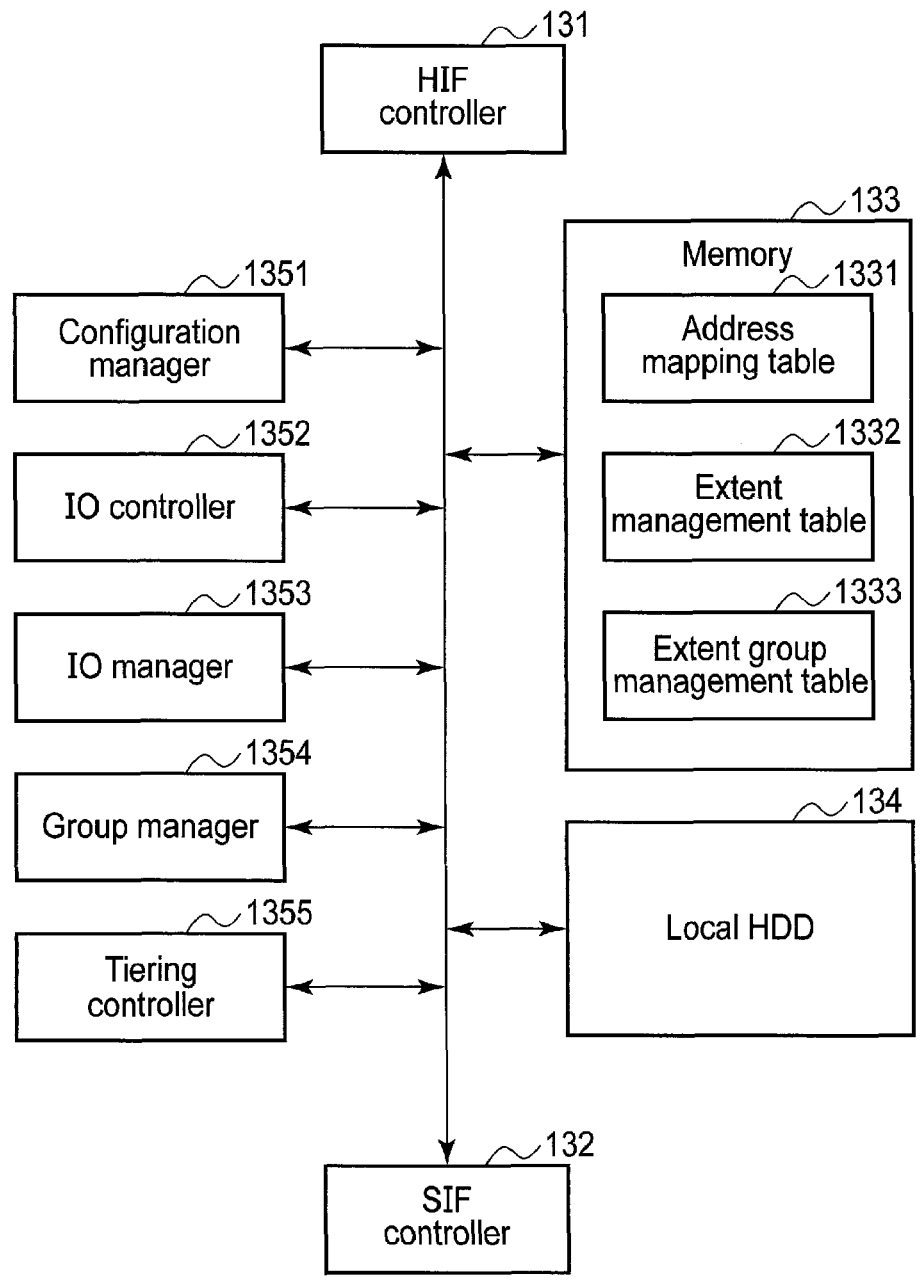
F I G. 2

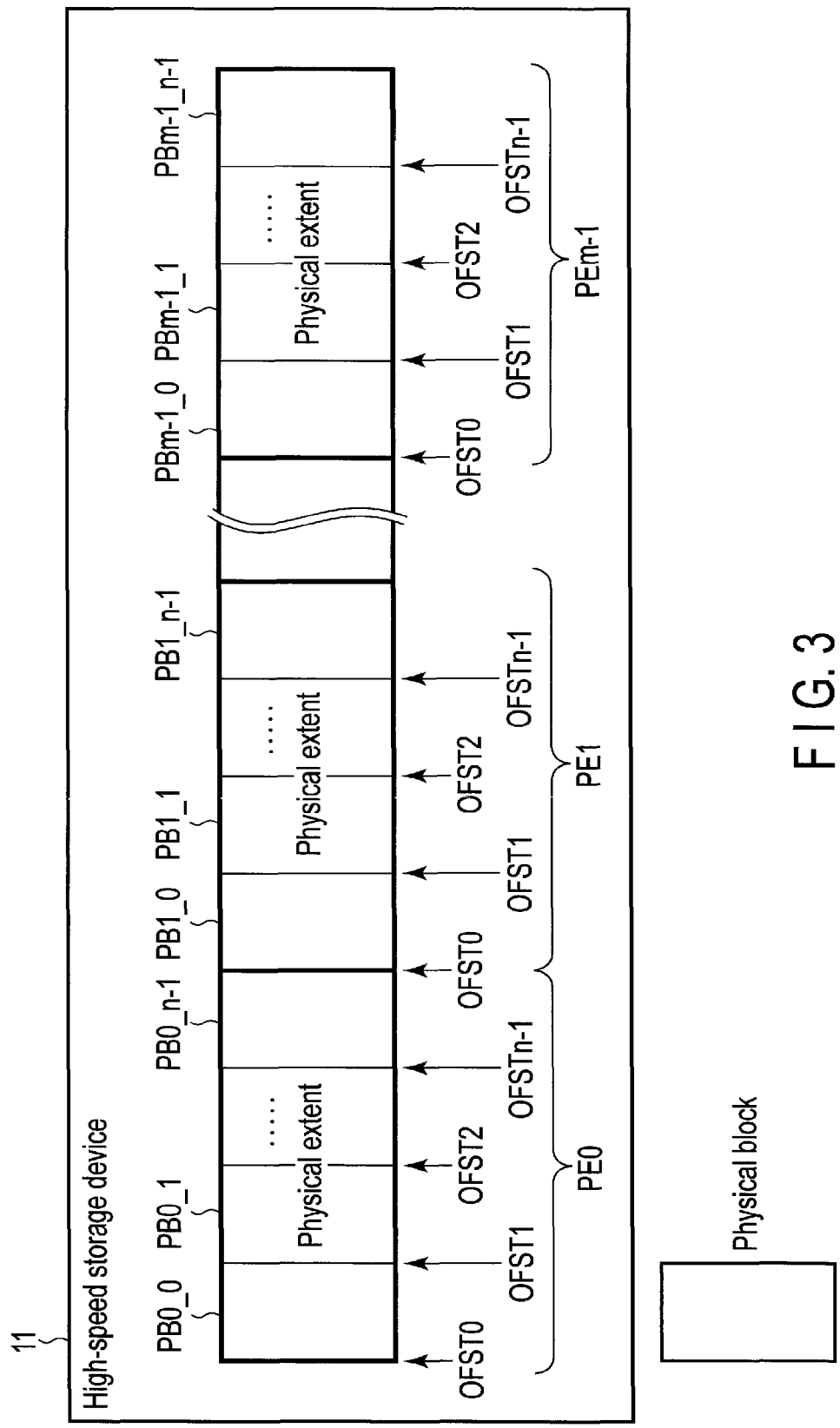
F I G. 3

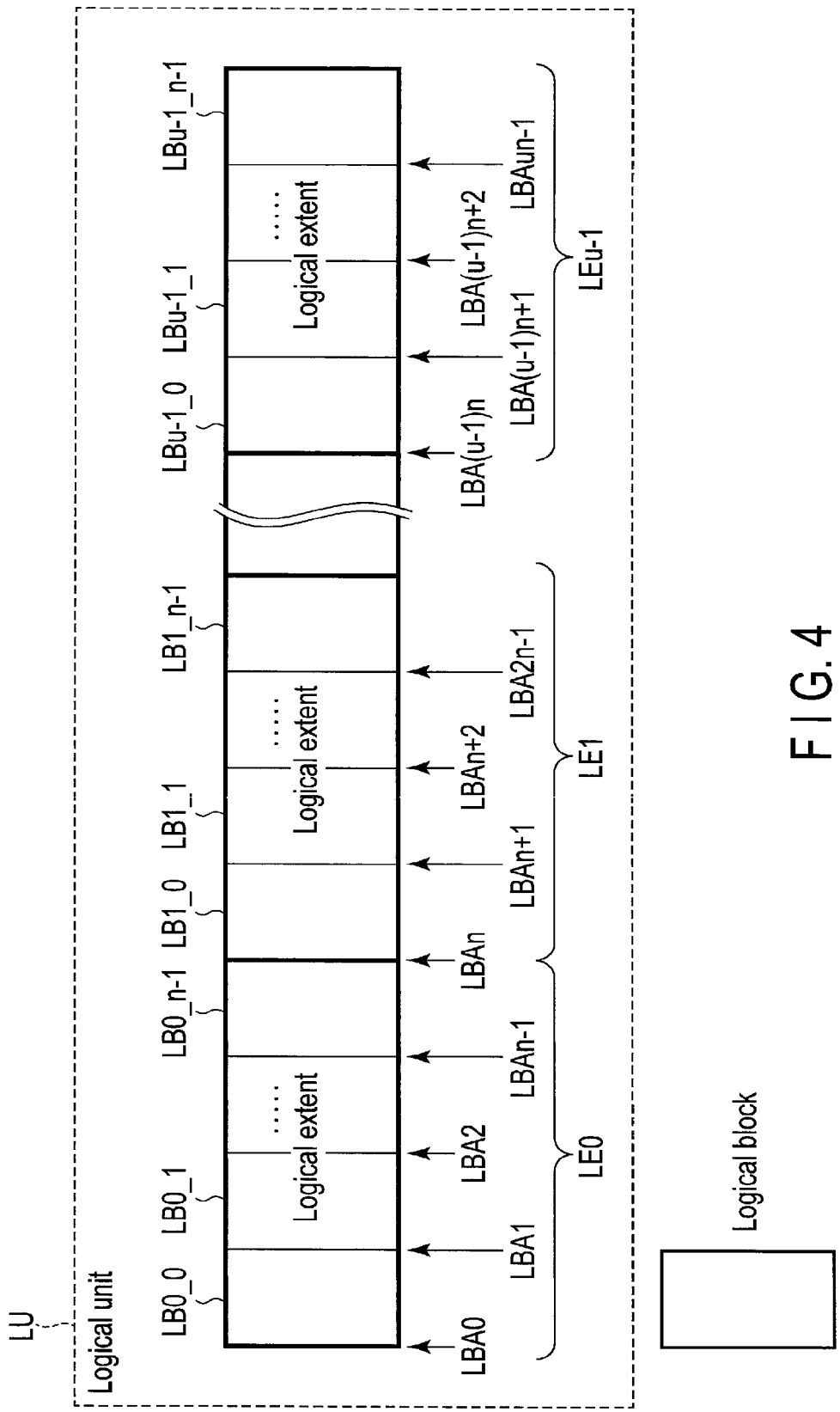
F I G. 4

1331

| Logical unit number (LUN) | Logical block address (LBA) | Logical extent number (LEN) | Physical extent number (PEN) | Offset |
|---|---|---|---|---|
| LUNa | LBAb | A | P | OFSTc |

F I G. 5

1332

| Logical extent number (LEN) | Preceding link extent (PLE) | Preceding link intensity (PLI) | Succeeding link extent (SLE) | Succeeding link intensity (SLI) | Access count (AC) | Last access time (LAT) |
|---|---|---|---|---|---|---|
| 1 | 0 | 0 | 0 | 0 | 0 | 0 |
| 2 | 0 | 0 | 0 | 0 | 0 | 0 |
| 3 | 0 | 0 | 0 | 0 | 0 | 0 |
| 4 | 0 | 0 | 0 | 0 | 0 | 0 |
| 5 | 0 | 0 | 0 | 0 | 0 | 0 |

F I G. 6

| Extent group number (EGN) | Representative extent number (REN) | Extent group constituent number (QTY) |
|---|---|---|
| 0 | 0 | 0 |
| 0 | 0 | 0 |
| 0 | 0 | 0 |
| 0 | 0 | 0 |

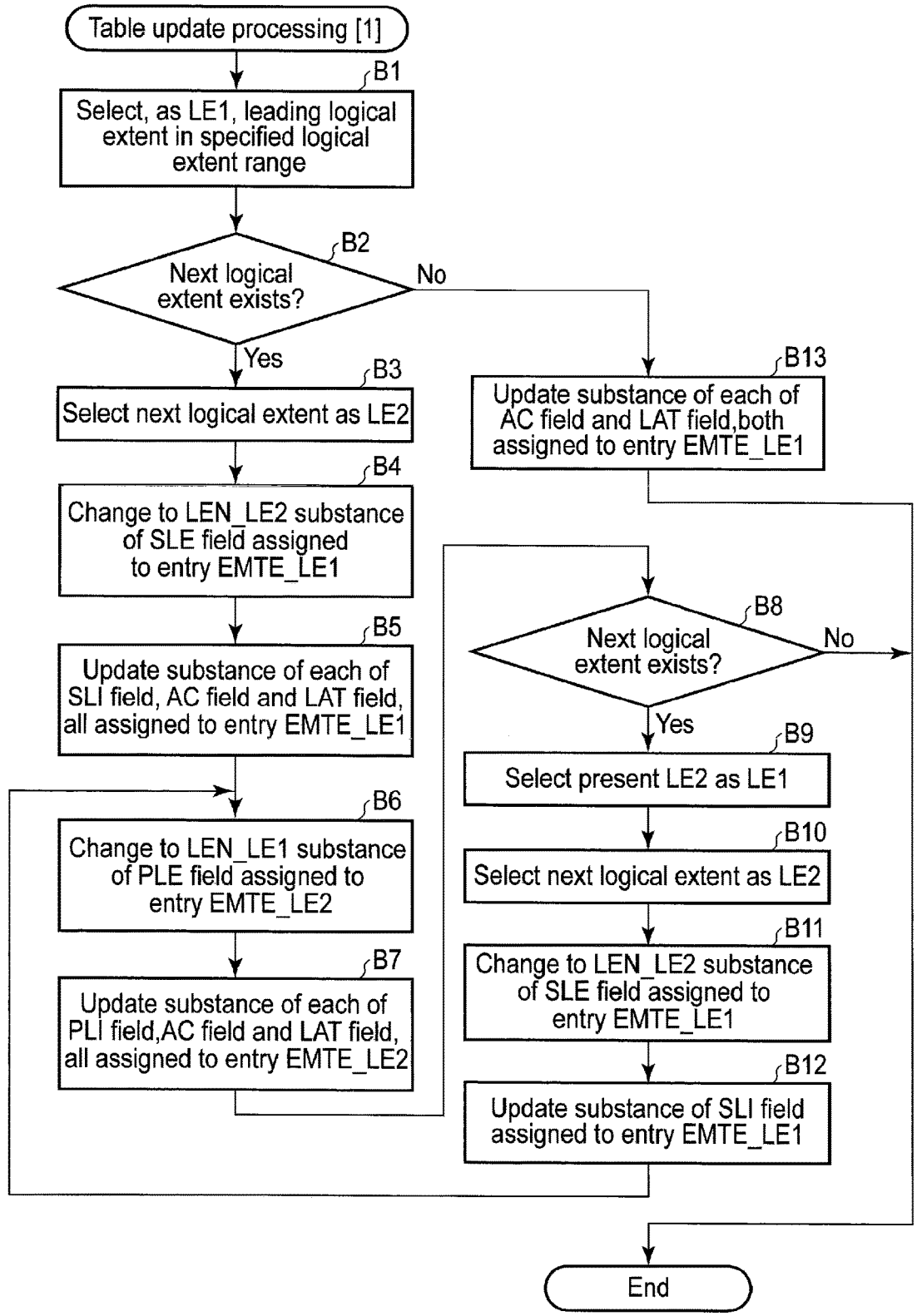
F I G. 10

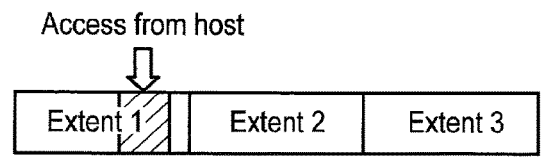
F I G. 13
| Logical extent number (LEN) | Preceding link extent (PLE) | Preceding link intensity (PLI) | Succeeding link extent (SLE) | Succeeding link intensity (SLI) | Access count (AC) | Last access time (LAT) |
|---|---|---|---|---|---|---|
| 1 | 0 | 0 | 0 | 0 | 0→1 | 0→ AA:BB:CC |
| 2 | 0 | 0 | 0 | 0 | 0 | 0 |
| 3 | 0 | 0 | 0 | 0 | 0 | 0 |
| 4 | 0 | 0 | 0 | 0 | 0 | 0 |
| 5 | 0 | 0 | 0 | 0 | 0 | 0 |
1332
F I G. 14

| Extent group number (EGN) | Representative extent number (REN) | Extent group constituent number (QTY) |
|---|---|---|
| 0→1 | 0→1 | 0→1 |
| 0 | 0 | 0 |
| 0 | 0 | 0 |
| 0 | 0 | 0 |

1333

1332

| Logical extent number (LEN) | Preceding link extent (PLE) | Preceding link intensity (PLI) | Succeeding link extent (SLE) | Succeeding link intensity (SLI) | Access count (AC) | Last access time (LAT) |
|---|---|---|---|---|---|---|
| 1 | 0 | 0 | 0 | 0 | 0 | 0 |
| 2 | 0 | 0 | 0→3 | 0→1 | 0→1 | 0→AA:BB:CC |
| 3 | 0→2 | 0→1 | 0 | 0 | 0→1 | 0→AA:BB:CC |
| 4 | 0 | 0 | 0 | 0 | 0 | 0 |
| 5 | 0 | 0 | 0 | 0 | 0 | 0 |

| Extent group number (EGN) | Representative extent number (REN) | Extent group constituent number (QTY) |
|---|---|---|
| 0→1 | 0→2 | 0→2 |
| 0 | 0 | 0 |
| 0 | 0 | 0 |
| 0 | 0 | 0 |

FIG. 18

| Logical extent number (LEN) | Preceding link extent (PLE) | Preceding link intensity (PLI) | Succeeding link extent (SLE) | Succeeding link intensity (SLI) | Access count (AC) | Last access time (LAT) |
|---|---|---|---|---|---|---|
| 1 | 0 | 2 | 2 | 2 | 2 | AA:BB:CC |
| 2 | 1 | 2 | 3 | 3 | 3 | DD:EE:FF |
| 3 | 2 | 3 | 0→4 | 0→1 | 3→4 | XX:XX:XX→GG:HH:II |
| 4 | 0→3 | 0→1 | 5 | 5 | 2→3 | XX:XX:XX→GG:HH:II |
| 5 | 4 | 5 | 6 | 6 | 4 | JJ:KK:LL |
| 6 | 5 | 6 | 0 | 0 | 6 | MM:NN:PP |
| | | | | | | |

1332

1332

| Logical extent number (LEN) | Preceding link extent (PLE) | Preceding link intensity (PLI) | Succeeding link extent (SLE) | Succeeding link intensity (SLI) | Access count (AC) | Last access time (LAT) |
|---|---|---|---|---|---|---|
| 1 | 0 | 2 | 2 | 2 | 2 | AA:BB:CC |
| 2 | 1 | 2 | 3 | 3 | 3 | DD:EE:FF |
| 3 | 2 | 3 | 4 | 1 | 4 | GG:HH:II |
| 4 | 3 | 1 | 5 | 5 | 3 | GG:HH:II |
| 5 | 4 | 5 | 6 | 6 | 4 | JJ:KK:LL |
| 6 | 5 | 6 | 0 | 0 | 6 | MM:NN:PP |

| Logical extent number (LEN) | Preceding link extent (PLE) | Preceding link intensity (PLI) | Succeeding link extent (SLE) | Succeeding link intensity (SLI) | Access count (AC) | Last access time (LAT) |
|---|---|---|---|---|---|---|
| 1 | 0 | 2 | 2 | 2 | 2 | AA:BB:CC |
| 2 | 1 | 2 | 3 | 3 | 3 | DD:EE:FF |
| 3 | 2 | 3 | 4 | 1 | 4 | GG:HH:II |
| 4 | 3 | 1 | 5 | 5 | 3 | GG:HH:II |
| 5 | 4 | 5 | 6 | 6 | 4 | JJ:KK:LL |
| 6 | 5 | 6 | 0 | 0 | 6 | MM:NN:PP |

| Extent group number (EGN) | Representative extent number (REN) | Extent group constituent number (QTY) |
|---|---|---|
| 1 | 1 | 3 |
| 2 | 4 | 3 |
| 0 | 0 | 0 |
| 0 | 0 | 0 |

(A) Before update

F I G. 23A

1333

| Extent group number (EGN) | Representative extent number (REN) | Extent group constituent number (QTY) |   |
|---|---|---|---|
| 1 | 1 | 6(3→6) |   |
| 0(2→0) | 0(4→0) | 0(3→0) | ← Deletion |
| 0 | 0 | 0 |   |
| 0 | 0 | 0 |   |

(B) After update

F I G. 23B

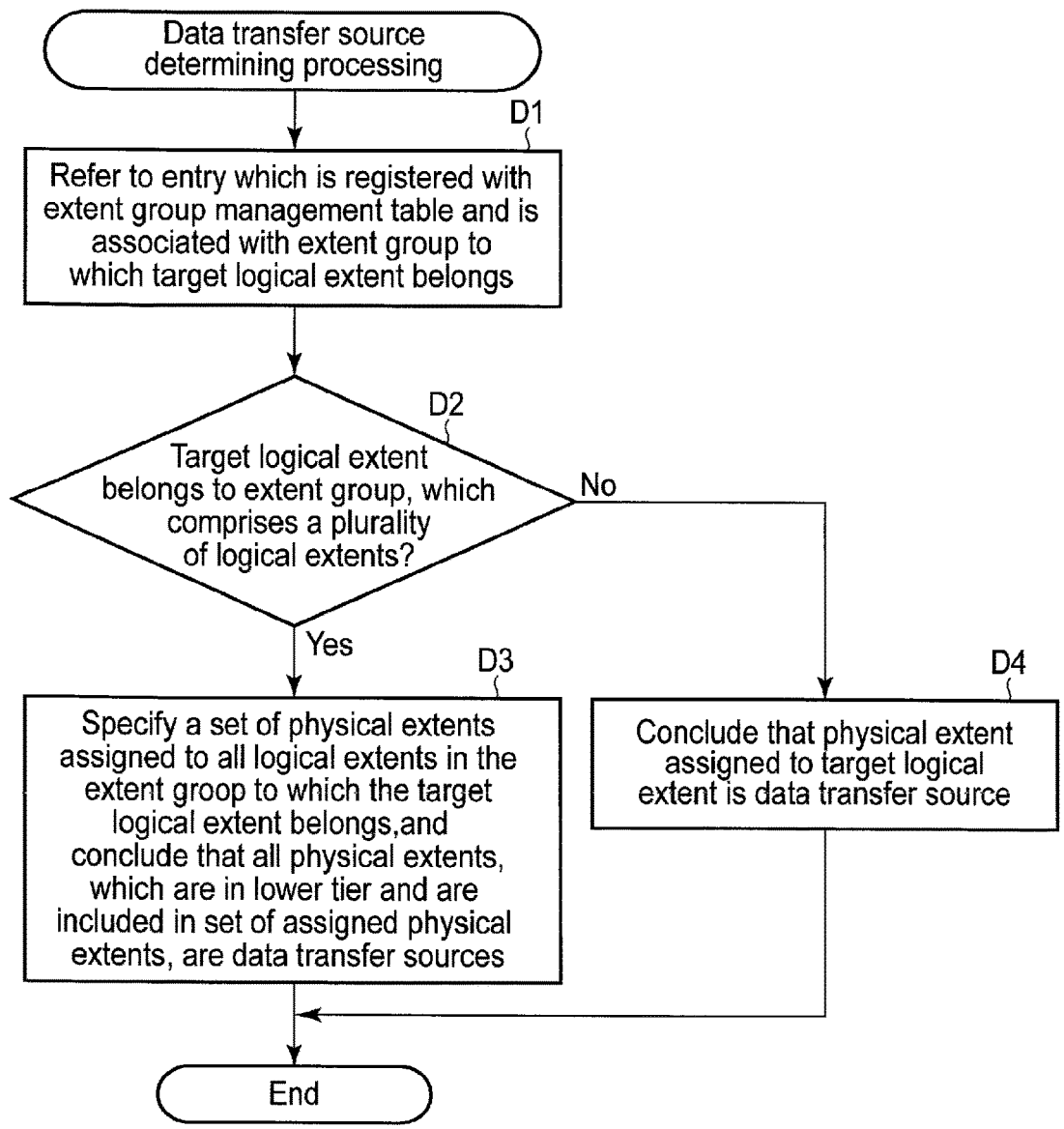
F I G. 24

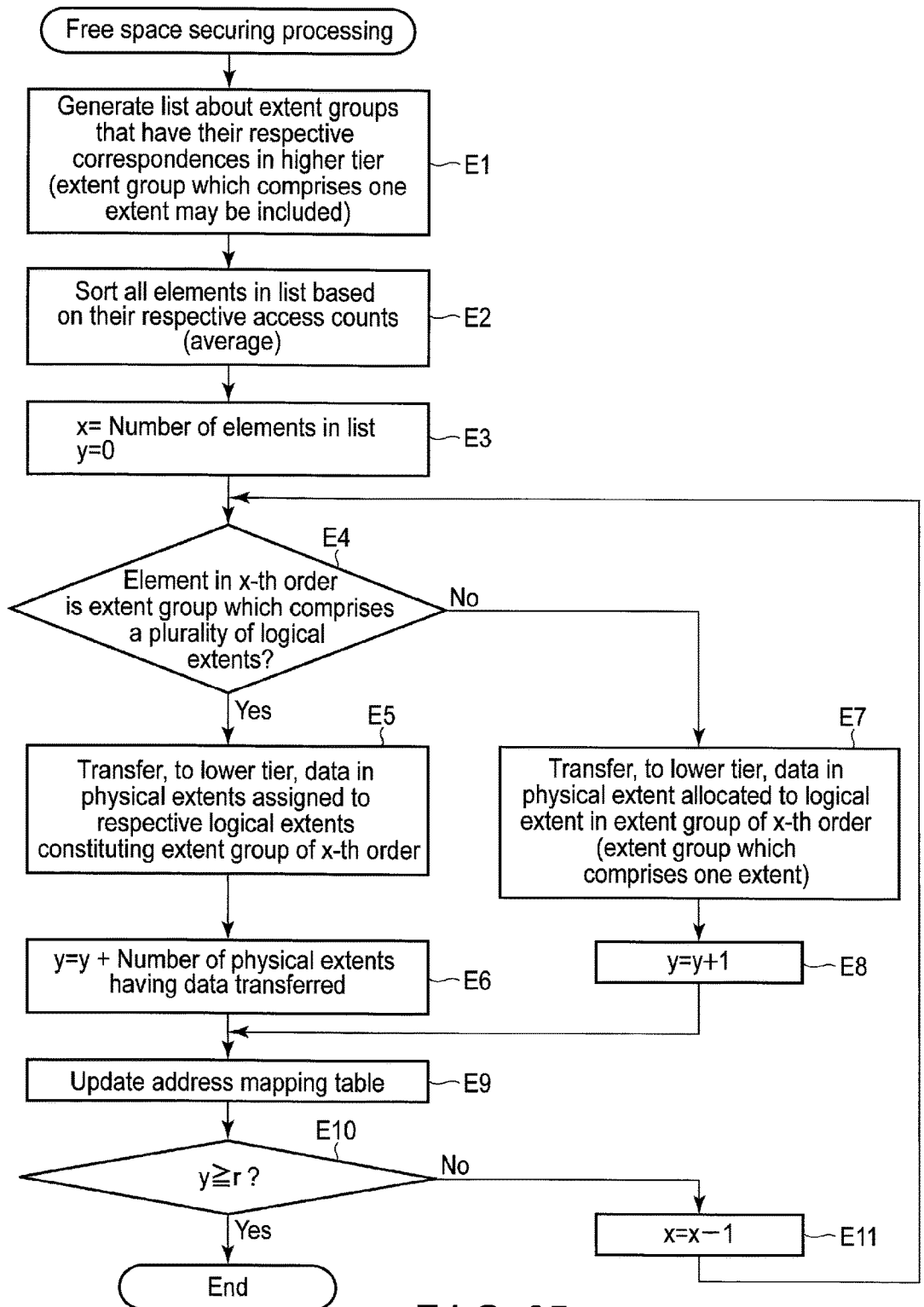
F I G. 25

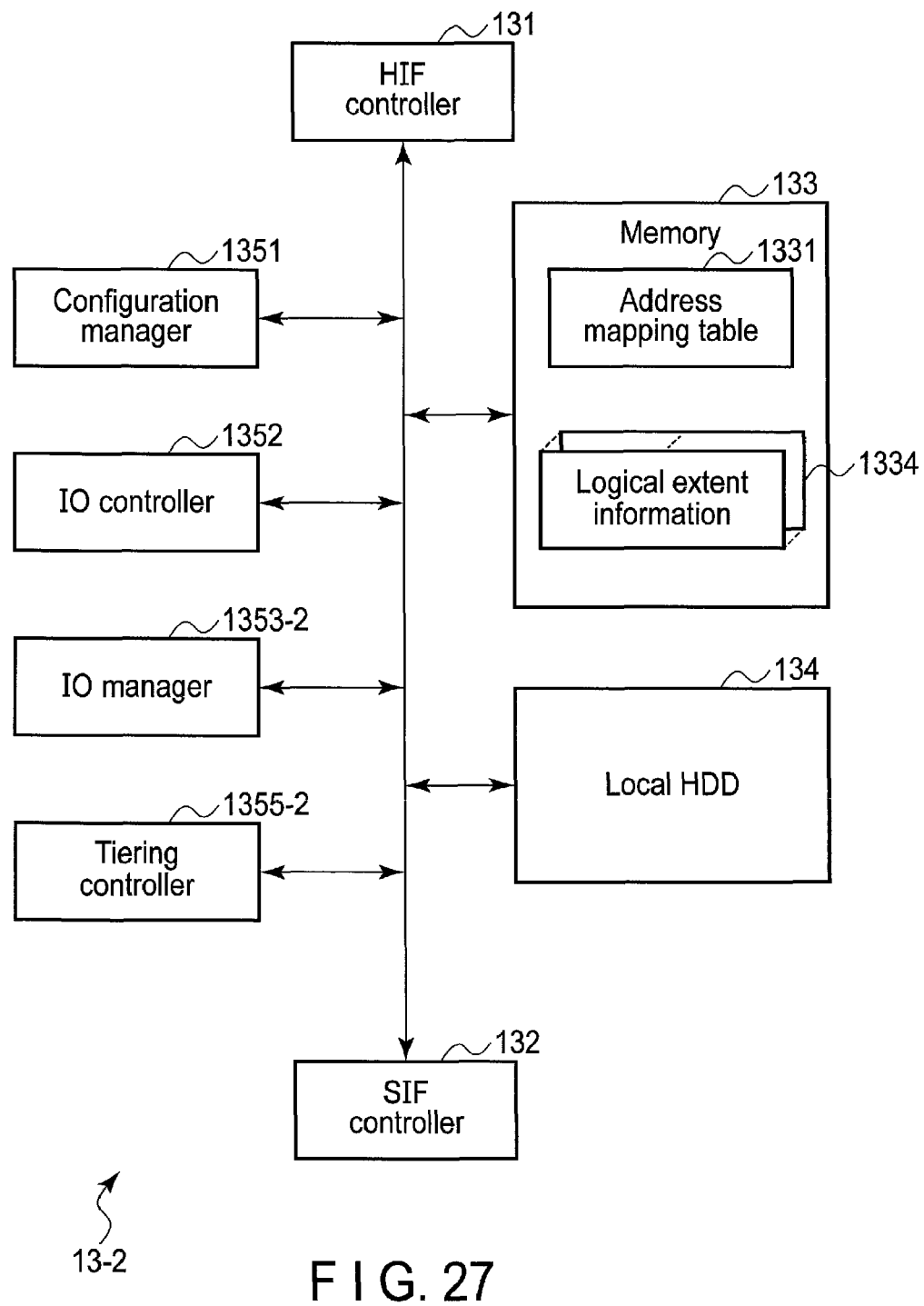
F I G. 27

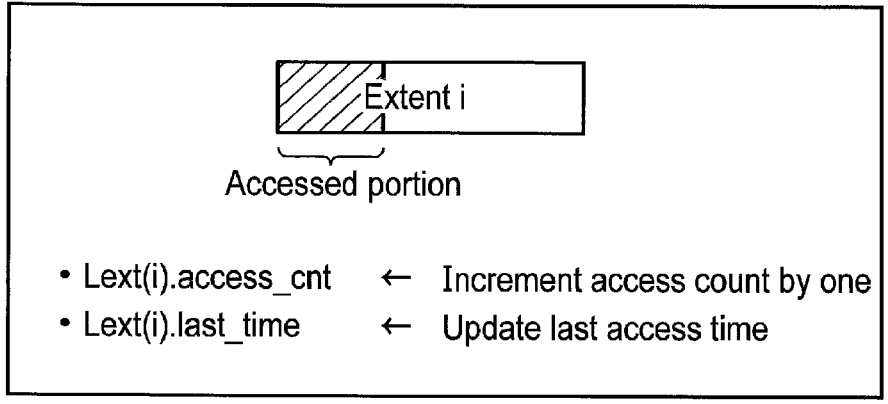
F I G. 30
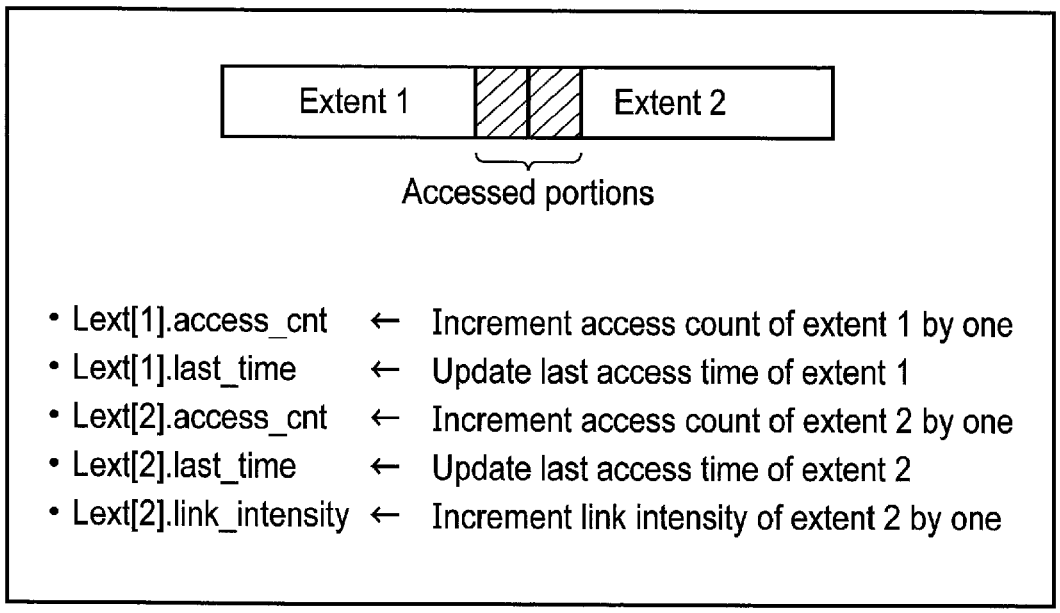
F I G. 31

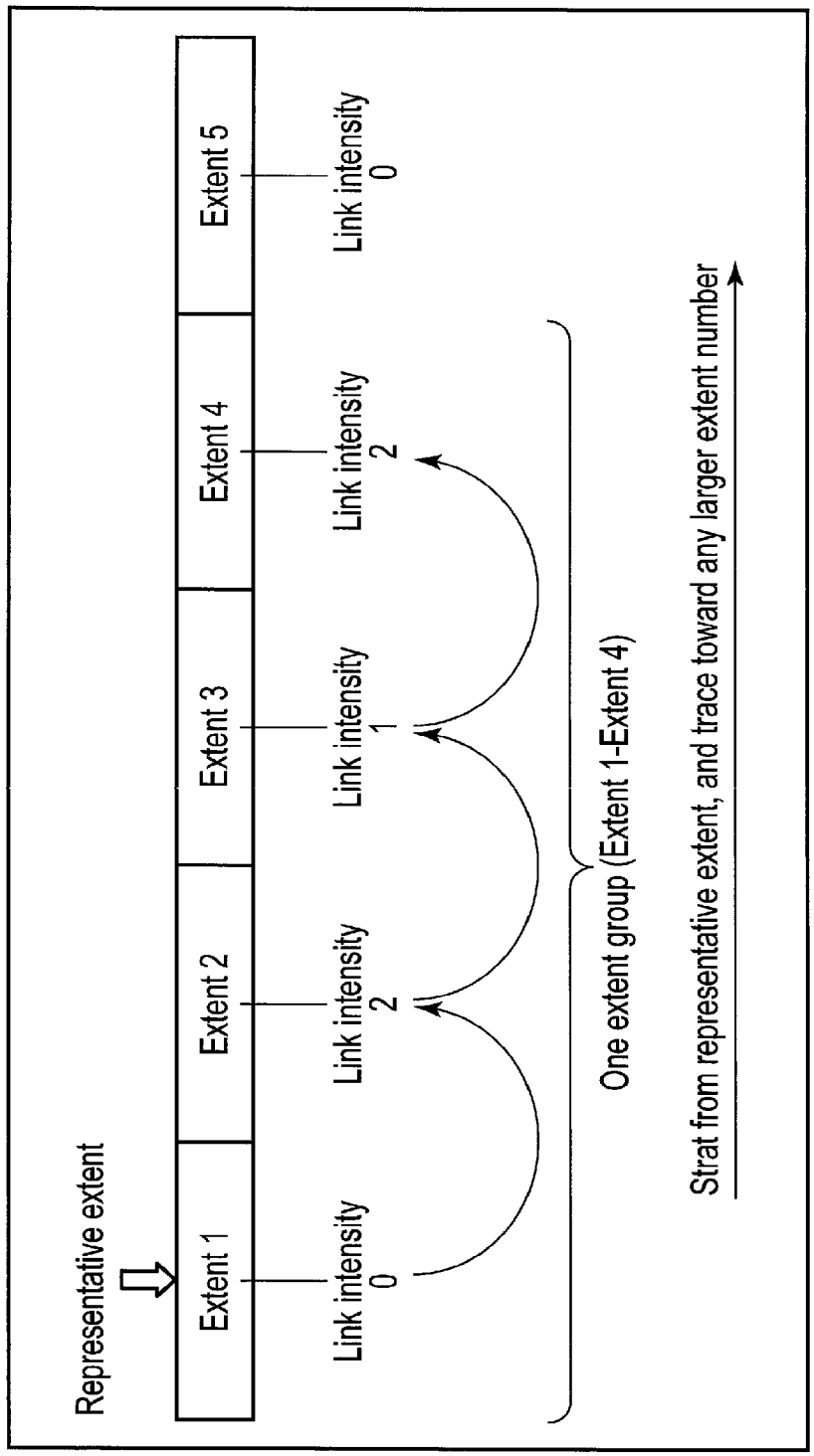
F I G. 34

TIERED STORAGE SYSTEM, STORAGE CONTROLLER AND TIERING CONTROL METHOD

CROSS-REFERENCE TO RELATED APPLICATIONS

This application is based upon and claims the benefit of priority from Japanese Patent Application No. 2016-231202, filed Nov. 29, 2016, the entire contents of which are incorporated herein by reference.

FIELD

Embodiments described herein relate generally to a tiered storage system, a storage controller, and a tiering control method.

BACKGROUND

In recent years, a storage system comprising a first and a second storage device different from each other in access speed has been developed. Here, let us suppose that the first storage device is fast in access speed but small in storage capacity, whereas the second storage device is slow in access speed but large in storage capacity. A storage system may be implemented by hierarchically combining the first storage device and the second storage device in such a manner that the first storage device may be positioned at a higher tier and the second storage device may be positioned at a lower tier. Such a technique is called a tiered storage technique, and a storage system to which the tiered storage technique is applied is called a tiered storage system.

In a tiered storage system, it is the characteristics, which each piece of data has, that determine and change which piece of data should be placed (stored) in which of the tiers (the storage devices). Specifically, a data piece which is high in access frequency should be placed in a higher tier (the first storage device) and another data piece which is low in access frequency should be placed in a lower tier (the second storage device). Such an arrangement (a tiered arrangement) will bring improvement in performance and suppression of cost to a storage system.

Generally, a tiered storage system automatically executes tiered classification. In order to automatically execute tiered classification, in a tiered storage system, a storage controller monitors an access status for every data set called an extent, for example. Generally, an extent has a size larger than a basic size (so called a block size) for data management (data access). An access status of each extent may be indicated by a statistic such as an access frequency.

The storage controller periodically evaluates every access frequency for every extent based on every access statistic, which every extent records, for example. Based on the periodical evaluation result, the storage controller transfers (relocates) pieces of data for every extent from a lower tier to a higher tier or from a higher tier to a lower tier. However, the data transfer between the tiers based on the periodical access frequency evaluation has a large overhead, and spends time on processing.

BRIEF DESCRIPTION OF THE DRAWINGS

FIG. 1 is block diagram illustrating a typical hardware configuration of a computer system including a tiered storage system of a first embodiment.

FIG. 2 is a block diagram mainly illustrating a typical functional structure of the storage controller illustrated in FIG. 1.

FIG. 3 is a view illustrating a typical relation between a physical extent and a physical block in the first embodiment.

FIG. 4 is a view illustrating a typical relation between a logical extent and a logical block in the first embodiment.

FIG. 5 is a view illustrating an exemplary data structure of an address mapping table illustrated in FIG. 2.

FIG. 6 is a view illustrating an exemplary data structure of an extent management table illustrated in FIG. 2.

FIG. 10 is a flow chart illustrating a typical procedure of a table update processing included in the access processing illustrated in FIG. 9 (a table update processing for the extent management table).

FIG. 13 is a first drawing for explaining how the extent management table and the extent group management table, both illustrated in FIG. 2, will be updated with taking a first case as an example.

FIG. 14 is a second drawing for explaining how the extent management table and the extent group management table, both illustrated in FIG. 2, will be updated with taking the first case as an example.

FIG. 17 is a second drawing for explaining how the extent management table and the extent group management table, both illustrated in FIG. 2, will be updated with taking the second case as an example.

FIG. 18 is a third drawing for explaining how the extent management table and the extent group management table, both illustrated in FIG. 2, will be updated with taking the second case as an example.

FIG. 21 is a third drawing for explaining how the extent management table and the extent group management table, both illustrated in FIG. 2, will be updated with taking the third case as an example.

FIG. 22 is a fourth drawing for explaining how the extent management table and the extent group management table, both illustrated in FIG. 2, will be updated with taking the third case as an example.

FIG. 23A and FIG. 23B are fifth drawings for explaining how the extent management table and the extent group management table, both illustrated in FIG. 2, will be updated with taking the third case as an example.

FIG. 24 is a flow chart illustrating a typical procedure of a data transfer source determination processing included in the access processing illustrated in FIG. 9.

FIG. 25 is a flow chart illustrating a typical procedure of a free space securing processing included in the access processing illustrated in FIG. 9.

FIG. 27 is a block diagram mainly illustrating a typical functional structure of a storage controller in a tiered storage system of a second embodiment.

FIG. 30 is a view for explaining how the logical extent information illustrated in FIG. 27 will be updated with taking a first case as an example.

FIG. 31 is a view for explaining how the logical extent information illustrated in FIG. 27 will be updated with taking a second case as an example.

FIG. 34 is a view for explaining how to examine how many extents constitute an extent group in the second embodiment.

DETAILED DESCRIPTION

Figures 7, 8:
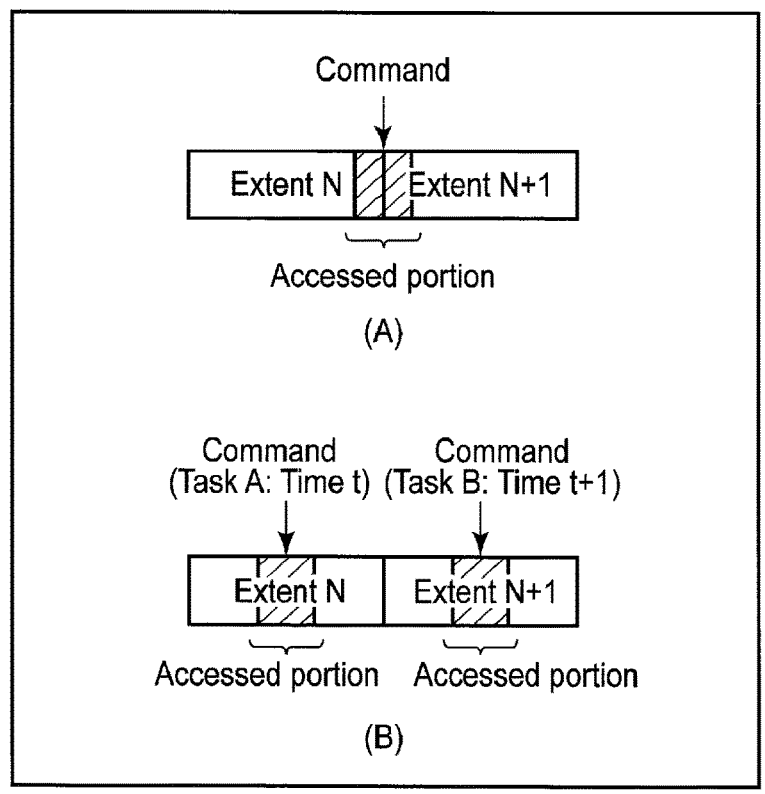
FIG. 7 is a view illustrating an exemplary data structure of an extent group management table illustrated in FIG. 2.
FIG. 8 is a view for explaining a criterion on which logical extents are correlated with one another in the first embodiment.

Embodiments will be described hereinafter with reference to the accompanying drawings.

In general, according to one embodiment, a tiered storage system includes a first storage device, a second storage device and a storage controller. The first storage device is positioned at a higher tier. The second storage device is positioned at a lower tier. The storage controller is configured to control access to the first storage device and the second storage device. The storage controller is configured to determine, when a range of an access request from a host computer to a logical unit extends over some of logical extents in the logical unit, that these logical extents are correlated with each other. Storage areas of the first and second storage devices are assigned in units of physical extents each comprising a plurality of physical blocks to the logical unit. The logical unit includes a plurality of logical extents each including a plurality of logical blocks each having a same size as that of a respective one of physical blocks. The storage controller is configured to transfer data of a set of the correlated logical extents as one extent group collectively in units of physical extents between the first storage device and the second storage device.

First Embodiment

First of all, a first embodiment is explained.

FIG. 1 is a block diagram illustrating a typical hardware configuration of a computer system including a tiered storage system of the present embodiment. The computer system illustrated in FIG. 1 comprises a tiered storage system 10 and a host computer (hereafter referred to as a host) 20. That is, the computer system has a single host. However, the computer system may have a plurality of hosts.

The host 20 uses logical units, which the tiered storage system 10 provides, as portions of its own external storage device. A logical unit is also called a logical disk or a logical volume, and includes a virtualized storage area (a logical storage area). Some logical units constitute a logical disk. The host 20 is connected, via a host interface bus 30, with the tiered storage system 10 (more specifically, a storage controller 13 of the tiered storage system 10). In the present embodiment, the host interface bus 30 is a fiber channel (FC). However, the host interface bus 30 may be any interface bus other than FC. For instance, it may be a small computer system interface (SCSI), a serial attached SCSI (SAS), an Internet SCSI (iSCSI), Ethernet (Registered Trademark), or a serial AT attachment (SATA). Moreover, the host 20 may be connected with the tiered storage system 10 via a network such as a Storage Area Network (SAN), the Internet, or an intranet.

The host 20 is a physical computer such as a server or a client personal computer. In the host 20, an application program for accessing data in the logical units which the tiered storage system 10 provides. The host 20 uses the tiered storage system 10 via the host interface bus 30 in accordance with the application program.

The tiered storage system 10 comprises a high-speed storage device (a first storage device) 11, a low-speed storage device (a second storage device) 12, and a storage controller 13. The high-speed storage device 11 and the low-speed storage device 12 are connected each other via a storage interface bus 14. In the present embodiment, the storage interface bus 14 is a fiber channel (FC). However, similarly to the host interface bus 30, the storage interface bus 14 may be any interface bus other than the fiber channel.

The high-speed storage device 11 may be a single solid state drive (SSD) which is compatible with a hard disk drive (HDD), and is much faster in access speed (excellent in access performance) than HDD's, for example. On the other hand, the low-speed storage device 12 may be a single HDD, for example.

Accordingly, in the present embodiment, the low-speed storage device 12 is lower in access speed than the high-speed storage device 11 (inferior in access performance). However, the low-speed storage device 12 is much larger in storage capacity than the high-speed storage device 11. In the present embodiment, the high-speed storage device 11 is used as a higher tier (high-speed tier, first tier) storage device, and the low-speed storage device 12 is used as a lower tier (low-speed tier, second tier) storage device. It should be noted that the tiered storage system 10 may comprise a storage device (a third tier storage device) much lower in speed than the low-speed storage device 12.

Furthermore, the high-speed storage device 11 may be a flash array storage device, which comprises flash memories, or a storage device called all flash arrays. Similarly, the low-speed storage device 12 may be an arrayed storage device which comprises an array of HDDs.

Moreover, the high-speed storage device 11 may be constructed from such a high-speed HDD that is used for an FC, and the low-speed storage device 12 may be constructed from such a low-speed HDD that is used for an SATA. Moreover, the low-speed storage device 12 may be an optical disc drive such as a Blue ray Disc (Registered Trademark) drive or a DVD (Registered Trademark) drive, or a tape device. Moreover, when a tape device is used as the low-speed storage device 12, an optical disc drive may be used as the high-speed storage device 11.

The storage controller 13 receives from the host 20 a request for access (read access or write access) using a logical address, and executes requested access. Upon executing the requested access, the storage controller 13 translates a logical address into a physical address using a well known address conversion function. A logical address indicates an address in the logical unit. A physical address indicates a physical position of a storage area which is included in the high-speed storage device 11 or the low-speed storage device 12, and which is associated with a logical address. The storage controller 13 accesses the high-speed storage device 11 or the low-speed storage device 12 based on a physical address.

The storage controller 13 comprises a host interface controller (hereafter referred to as an HIF) 131, a storage interface controller (hereafter referred to as an SIF) 132, a memory 133, a local HDD 134, and a CPU 135.

The HIF controller 131 controls transfer of data between the HIF controller 131 and the host 20 (a data transfer protocol). The HIF controller 131 receives an access request from the host 20, and replies to the access request with a response. The access request specifies either reading data from a logical unit or writing data in a logical unit (namely, it specifies access to a logical unit). When receiving an access request from the host 20, the HIF controller 131 transmits the access request to the CPU 135. The CPU 135 which receives the access request processes the access request.

The SIF controller 132 receives from the CPU 135 an access command (specifically a read command or a write command for the high-speed storage device 11 or the low-speed storage device 12) corresponding to the access request which the CPU 135 has received from the host 20. The SIF controller 132 executes access to the high-speed storage device 11 or the low-speed storage device 12 according to the received access command.

The memory 133 is a rewritable volatile memory such as a DRAM. A part of a storage area of the memory 133 is partially used for storing at least one portion of a control program having been loaded from the local HDD 134. Another part of the storage area of the memory 133 is used for storing an address mapping table 1331, an extent management table 1332 and an extent group management table 1333 (FIG. 2), all having been loaded from the local HDD 134.

The control program is stored in the local HDD 134. Upon startup of the storage controller 13, the CPU 135 loads into the memory 133 at least one portion of the control program stored in the local HDD 134, by executing an initial program loader (IPL). The IPL is stored in a nonvolatile memory such as a ROM or a flash ROM.

The CPU 135 is a processor such as a microprocessor, for example. In accordance with the control program having been loaded into the memory 133, the CPU 135 functions as a configuration manager 1351, an input output (IO) controller 1352, an input output (IO) manager 1353, a group manager 1354 and a tiering controller 1355 (FIG. 2). That is, the CPU 135 controls the whole of the tiered storage system 10, by executing the control program temporally stored in the memory 133.

In the present embodiment, the storage controller 13 is independent of the host 20 as illustrated in FIG. 1. However, the storage controller 13 may be built in the host 20. In such a case, the storage controller 13 (specifically, functions of the storage controller 13) may be realized by using some functions of the operating system (OS) of the host 20.

Moreover, the storage controller 13 may be installed in a card which is inserted in a card slot of the host 20. A part of the storage controller 13 may be built in the host 20, and another part of the storage controller 13 may be installed in a card. Moreover, the host 20, the storage controller 13, and one or both of the high-speed storage device 11 and the low-speed storage device 12 may be housed in a single case.

FIG. 2 is a block diagram mainly illustrating a typical functional structure of the storage controller 13 illustrated in FIG. 1. The storage controller 13 includes the configuration manager 1351, the IO controller 1352, the IO manager 1353, the group manager 1354 and the tiering controller 1355. At least one of the configuration manager 1351, the IO controller 1352, the IO manager 1353, the group manager 1354 and the tiering controller 1355 may be implemented by hardware.

The configuration manager 1351 manages a storage structure of the tiered storage system 10. The configuration management includes constructing logical units based on both the storage area of the high-speed storage device 11 and the storage area of the low-speed storage device 12, and providing the host 20 with the logical units. In the present embodiment, a storage area (a logical storage area) of logical unit is divided into small regions, which are the same in size and which are called a logical block, for management of the logical unit. That is, logical unit comprises a plurality of logical blocks.

In contrast, storage areas (a physical storage area) of the high-speed storage device 11 and the low-speed storage device 12 are divided into regions, which are larger in size than a logical block and which are called a physical extent. Each physical extent is further divided into much smaller regions, which are the same in size as a logical block and which are called a physical block. That is, storage areas of the high-speed storage device 11 and the low-speed storage device 12 comprise a plurality of physical extents, and each physical extent comprises a fixed number of continuous physical blocks.

In the present embodiment, a storage area of the logical unit is also divided into regions, which are called a logical extent and which are the same in size as a physical extent. That is, a storage area of the logical unit comprises a plurality of logical extents. Each logical extent comprises continuous logical blocks, which are the same in number as the physical blocks which constitute a physical extent. Accordingly, a boundary between adjacent logical extents coincides with a boundary between adjacent logical blocks.

A size of each of the physical extent and the logical extent is 4 kilobytes (KB), i.e., 4,096 bytes (B), for example. A size of each of the physical block and the logic block is 512 bytes (B), for example. Accordingly, the above mentioned fixed number will be 8. This means that a physical extent comprises eight physical blocks and a logical extent comprises eight logical blocks. It should be noted that an extent size is not confined to 4 KB, a block size is not confined to 512 B, and a fixed number is not confined to 8.

In response to an access request for reading data received from the host 20, the IO controller 1352 reads data from the high-speed storage device 11 or the low-speed storage device 12. In response to an access request for writing data write received from the host 20, the IO controller 1352 writes data in the high-speed storage device 11 or the low-speed storage device 12.

The IO manager 1353 manages IO (access) corresponding to the access request from the host 20. The IO manager 1353 divides the storage area of a logical unit into a plurality of above mentioned logical extents mainly for the IO management. That is, the IO manager 1353 manages the storage area of logical unit as a storage area which has a plurality of logical extents. The IO management includes assigning physical blocks in storage areas of the high-speed storage device 11 and the low-speed storage device 12 to logical blocks in storage areas of the logical units, and managing the assigned state. The address mapping table 1331 is used for management of the state of the assignment. The division into a logical extent may be made by the configuration manager 1351. The IO management further includes acquiring an access (IO) statistic which indicates a status of access for each of logical extents (hereafter referred to as an access count). Access count of each of logical extents is managed by using the extent management table 1332.

The group manager 1354 manages logical extents, which show correlation, as an extent group. Extent group is managed by using the extent group management table 1333. Correlation between logical extents will be described later.

The tiering controller 1355 rearranges data such that a piece of data which is high in access frequency but in spite of that is in a physical extent in the low-speed storage device 12 is moved from there to a physical extent in the high-speed storage device 11, whereas a piece of data which is low in access frequency but in spite of that is in a physical extent in the high-speed storage device 11 is moved from there to a physical extent in the low-speed storage device 12.

FIG. 3 illustrates a typical relation between a physical extent and a physical block in the present embodiment. As illustrated in FIG. 3, the storage area of the high-speed storage device 11 is divided into m physical extents PE0, PE1, . . . , PEm−1. That is, the high-speed storage device 11 has m physical extents PE0 to PEm−1. Moreover, the storage area of the high-speed storage device 11 is divided into m×n physical blocks PB0_0, . . . , PB0_n−1, PB1_0, . . . , PB1_n−1, . . . , PBm−1_0, . . . , PBm−1_n−1. That is, the high-speed storage device 11 has m×n physical blocks PB0_0, . . . , PB0_n−1, PB1_0, . . . , PB1_n−1, . . . , PBm−1_0, . . . , PBm−1_n−1.

Here, The i-th physical extent (i=0, 1, . . . , m−1) of the high-speed storage device 11 is hereafter expressed as the physical extent PEi. The physical extent PEi comprises continuous n physical blocks PBi_0 to PBi_n−1 in the storage area of the high-speed storage device 11. That is to say, physical blocks PBi_0 to PBi_n−1 constitute a single physical extent PEi. Here, n stands for the above mentioned fixed number, and will be 8 in the present embodiment since an extent has a size of 4 KB and a block has a size of 512 B.

The above mentioned relation between the physical extents and the physical blocks with respect to the high-speed storage device 11 may also be applied to the low-speed storage device 12. If necessary, the above mentioned explanation with respect to the relation between the physical extents and the physical blocks should be changed in such a manner that the high-speed storage device 11 is replaced with the low-speed storage device 12 and that the mark m is replaced with another mark (for example, d). The mark d indicates numbers of physical extents in the low-speed storage device 12.

The physical extent PEi in the high-speed storage device 11 may be indicated by a physical extent number 0i, for example. Accordingly, the physical extent number 0i is an identifier which identifies the physical extent PEi. The physical extent number 0i comprises, for example, a combination of a storage number 0 and an internal physical extent number i. The storage number 0 is used as an identifier which indicates the high-speed storage device 11 (a storage identifier). The internal physical extent number i is used as an identifier (an extent identifier) which indicates an i-th physical extent (namely, the physical extent PEi) in the storage device indicated by the storage number 0 (namely, the high-speed storage device 11).

A physical block PBi_j (j=0, 1, . . . , n−1) which is in a j-th order in the physical extent PEi is indicated by a physical extent number 0i and an offset OFSTj. The offset OFSTj indicates a relative position which the j-th physical block (namely, a physical block PBi_j) occupies in the physical extent PEi.

Similarly, a physical extent PEk (k=0, 1, . . . , h−1) which is in a k-th order in the low-speed storage device 12 is indicated by a physical extent number 1k. The physical extent number 1k comprises, for example, a combination of a storage number 1 and an internal physical extent number k. The storage number 1 is used as an identifier which indicates the low-speed storage device 12. The internal physical extent number k is used as an identifier which indicates a k-th physical extent (namely, the physical extent PEk) in the storage device indicated by the storage number 1 (namely, the low-speed storage device 12) A physical block PBk_j which is in a j-th order in the physical extent PEk is indicated by a physical extent number 1k and the offset OFSTj. The above mentioned physical extent numbers 0i and 1k are unique in the whole physical memory region (physical address space) provided by the high-speed storage device 11 and the low-speed storage device 12.

FIG. 4 illustrates a typical relation between a logical extent and a logical block in the present embodiment. A logical unit LU is illustrated in FIG. 4. A storage area (specifically, a virtual storage area) of the logical unit LU is divided into u×n logical blocks LB0_0, . . . , LB0_n−1, LB1_0, LB1_n−1, . . . , LBu−1_0, . . . , LBu−1_n−1. That is, the logical unit LU comprises u×n logical blocks LB0_0, . . . , LB0_n−1, LB1_0, . . . , LB1_n−1, . . . , LBu−1_0, . . . , LBu−1_n−1. Moreover, the storage area of the logical unit LU is also divided into u logical extents LE0, . . . , LEu−1. That is, a logical unit LU has u logical extents LE0 to LEu−1.

It should be noted here that a logical extent which is in an s-th order in the logical unit LU (s=0, 1, . . . , u−1) is expressed as a logical extent LEs. The logical extent LEs comprises n logical blocks LBs_0 o LBs_n−1 which are continuous in the storage area of the logical unit LU. In other words, the logical blocks LBs_0 to LBs_n−1 constitute the logical extent LEs. The logical blocks LBs_0 to LBs_n−1 are respectively an s×n-th logical block to a (s+1)×n−1-th logical block in the logical unit LU.

In the present embodiment, the storage controller 13 can recognize the logical blocks LB0_0, . . . , LB0_n−1, LB1_0 . . . , LB1_n−1, . . . , LBu−1_0, . . . , LBu−1_n−1 in the logical unit LU and the logical extents LE0 to LEu−1 in the logical unit LU.

In contrast to this, the host 20 can recognize only logical blocks LB0_0, . . . , LB0_n−1, LB1_0, . . . , LB1_n−1, . . . , LBu−1_0, . . . , LBu−1_n−1. However, it does not matter if the configuration manager 1351 notifies the host 20 of the definition contents of a logical extent including the size of the logical extent, thereby enabling the host 20 to recognize logical extents LE0 to LEu−1 in the logical unit LU.

The host 20 identifies (specifies) a t-th logical block (t=0, 1, . . . , u×n−1) in a logical unit LU by a logical unit number LUN and a logical block address LBAt (LBA=LBAt=t). The logical unit number LUN (for example, 0) is used as an identifier which indicates the logical unit LU. The logical block address LBAt is used as an address which indicates the t-th logical block in the logical unit (more specifically, the logical unit LU indicated by the logical unit number LUN).

The t-th logical block in the logical unit LU (namely, a logical block whose logical block address is LBAt=t) may be expressed as LBv_w (a logical block LBv_w), when the quotient of t/n is denoted by v (v=0, 1, . . . u−1) and its remainder by w (w=0, 1, . . . , n−1). LBv_w indicates the w-th logical block in the v-th logical extent in the logical unit LU. Clearly, t is in agreement with v×n+w=(v+1)×n (n−w). In the present embodiment, the IO manager 1353 divides the logical block address LBAt (=t) by n, thereby identifying the logical extent LEv, to which the logical block (LBv_w) specified by the logical block address LBAt belongs, and the relative position w in the logical extent LEv of the logical block.

FIG. 5 illustrates an exemplary data structure of the address mapping table 1331 illustrated in FIG. 2. The address mapping table 1331 has entry groups which are associated with all the logical blocks in all the logical units which the configuration manager 1351 provides, for example. Each entry of the address mapping table 1331 has a logical unit number (LUN) field, a logical block address (LBA) field, a logical extent number (LEN) field, a physical extent number (PEN) field, and an offset field.

The LUN field is used for holding a logical unit number which indicates a logical unit including a corresponding logical block. The LBA field is used for holding an address (a logical block address) corresponding logical block.

The LEN field is used for holding a logical extent number as an identifier for identifying a logical extent including a corresponding logical block. The logical extent number is unique in the whole logical storage area (or the whole logical address space), to which all the logical units provided by the configuration manager 1351 belong. A logical extent number comprises a combination of a logical unit number and an internal logical extent number. An internal logical extent number is unique in a logical unit including a corresponding logical block, and is an identifier which identifies a logical extent including a corresponding logical block in the logical unit.

The PEN field is used for holding a physical extent number. The physical extent number indicates a physical extent assigned to a logical extent including a corresponding logical block (namely, a physical extent including a physical block assigned to a corresponding logical block). The offset field is used for holding an offset (offset data). The offset indicates a relative position of a physical block in a physical extent including the physical block assigned to a corresponding logical block.

FIG. 6 illustrates an exemplary data structure of the extent management table 1332 illustrated in FIG. 2. The extent management table 1332 has entry groups associated with all the logical extents in all the logical units which the configuration manager 1351 provides, for example. Each entry of the extent management table 1332 has a logical extent number (LEN) field, a preceding link extent (PLE) field, a preceding link intensity (PLI) field, a succeeding link extent (SLE) field, a succeeding link intensity (SLI) field, an access count (AC) field, and a last access time (LAT) field.

The LEN field is used for holding a logical extent number which indicates a corresponding logical extent.

The PLE field is used for holding a logical extent number of a preceding link extent. The preceding link extent indicates a logical extent located before a corresponding logical extent, which is accessed along with the corresponding logical extent by an access request issued by the host 20. The PLI field is used for holding a count indicative of how many times a corresponding logical extent is accessed along with a preceding link extent (a logical extent illustrated in the PLE field) by a access request issued by the host 20.

The SLE field is used for holding a logical extent number of a succeeding link extent. The succeeding link extent indicates a logical extent located behind a corresponding logical extent, which is accessed along with the corresponding logical extent by an access request issued by the host 20. The SLI field is used for holding a count indicative of how many times a corresponding logical extent is accessed along with a succeeding link extent (a logical extent illustrated in the SLE field) by a access request issued by the host 20.

The AC field is used for holding an access count which indicates a count of how many times a corresponding logical extent has been accessed (an access frequency). The LAT field is used for holding a last access time data piece, which indicates a moment (time and date) when the corresponding logical extent was accessed last.

In the exemplary extent management table 1332 illustrated in FIG. 6, each entry has a value 0 in each of the PLE field, the PLI field, the SLE field, the SLI field, AC field and the LAT field. Values 0, which are illustrated in the PLE field, the PLI field, the SLE field and the SLI field for every entry, are all initial values, and indicate that neither a preceding link extent nor a succeeding link extent has been accessed by the host 20 through issuance of an access request. Therefore, use of 0 as a logical extent number shall be forbidden in the present embodiment. Furthermore, an initial value for each of the PLE field and the SLE field is not confined to 0, but any specific value may be used if it is different from a value selected for the logical extent number.

The extent management table 1332 is initially set as follows for every entry. The logical extent number of the logical extent associated with an entry is set to the LEN field of the entry. A value of 0 is set to each of the remaining fields of the entry. FIG. 6 illustrates an initialized extent management table 1332.

FIG. 7 illustrates an exemplary data structure of the extent group management table 1333 illustrated in FIG. 2. The extent group management table 1333 has entry groups which are managed by the group manager 1354 as extent groups and which are associated with logical extent groups. The group manager 1354 uses the extent group management table 1333 to manage a logical extent which does not have any correlation with other logical extents as a single logical extent (extent group comprising one logical extent). That is, entry groups which the extent group management table 1333 manages may include entry that is associated with a logical extent which the group manager 1354 manages as a single logical extent. Accordingly, the extent group management table 1333 can hold entries as many as the maximum number of logical extents. Each entry of the extent group management table 1333 has an extent group number (EGN) field, a representative extent number (REN) field and a configured extent group number (QTY) field.

The EGN field is used for holding an extent group number as an identifier for identifying an extent group which is set of logical extents. The extent group number is produced by the group manager 1354 when the extent group is prepared.

The REN field is used for holding a logical extent number which indicates a logical extent which represents an extent group comprising a set of logical extents or, more specifically, which is located at the lead of the set of logical extents.

The QTY field is used for holding for a total number which is indicative of how many logical extents belong to or constitute an extent group.

An initial value of the EGN field, the REN field and the QTY field in the extent group management table 1333 is initially set to 0, for example. FIG. 7 illustrates a state where the extent group management table 1333 does not have any extent groups yet. As mentioned above, the extent group management table 1333 can hold entries as many as the maximum number of logical extents, but there is not necessarily need to previously prepare entries as many as the maximum number of logical extents. The group manager 1354 may adaptively manage the number of entered logical extents by adding or deleting at least one logical extent to or from the extent group management table 1333 as the need arises.

Now, it will be explained with reference to FIG. 8 how the present embodiment determines whether there are any logical extents that are correlated with one another. When an access range specified by an access request (based on one single command issued) from the host 20 extends from one logical extent to another logical extent as illustrated in a portion (A) of FIG. 8, the tiered storage system 10 of the present embodiment or, more specifically, the group manager 1354 of the storage controller 13 determines that the logical extents specified by the access request have correlation. In the example illustrated in the portion (A) of FIG. 8, a range specified by an access request extends from an extent N to an extent N+1. Therefore, it is determined that these two extents have correlation. FIG. 8 illustrates in its portion (A) a case where a range specified by an access request extends two adjacent logical extents. However, it is needless to say that, if a range specified by an access request should extend three or more logical extents, it will be determined that the three or more logical extents should have correlation.

FIG. 8 further illustrates in its portion (B) a comparative case where it is determined that successively accessed logical extents have correlation unlike the present embodiment. In the example illustrated in the portion (B) of FIG. 8, if an extent N and an extent N+1 are successively accessed, then it will be determined that these two extents should have correlation. However, a recent CPU 135 has normally a multitasking function which executes different tasks in parallel. Accordingly, continuous occurrences of access have not necessarily caused by one task. The portion (B) of FIG. 8 illustrates an example in which an extent N is accessed by a task A and then an extent N+1 is successively accessed by a task B. In such a case, it is a mistake to determine that the extent N and the extent N+1 have correlation.

Such an erroneous determination will never occur in the present embodiment, since it is after an access range specified by an access request (based on one single command issued) from the host 20 extends over some logical extents that it is determined that the logical extents specified by the access request have correlation. The present embodiment can correctly prepare an extent group comprising a set of correlated logical extents.

Figure 9:
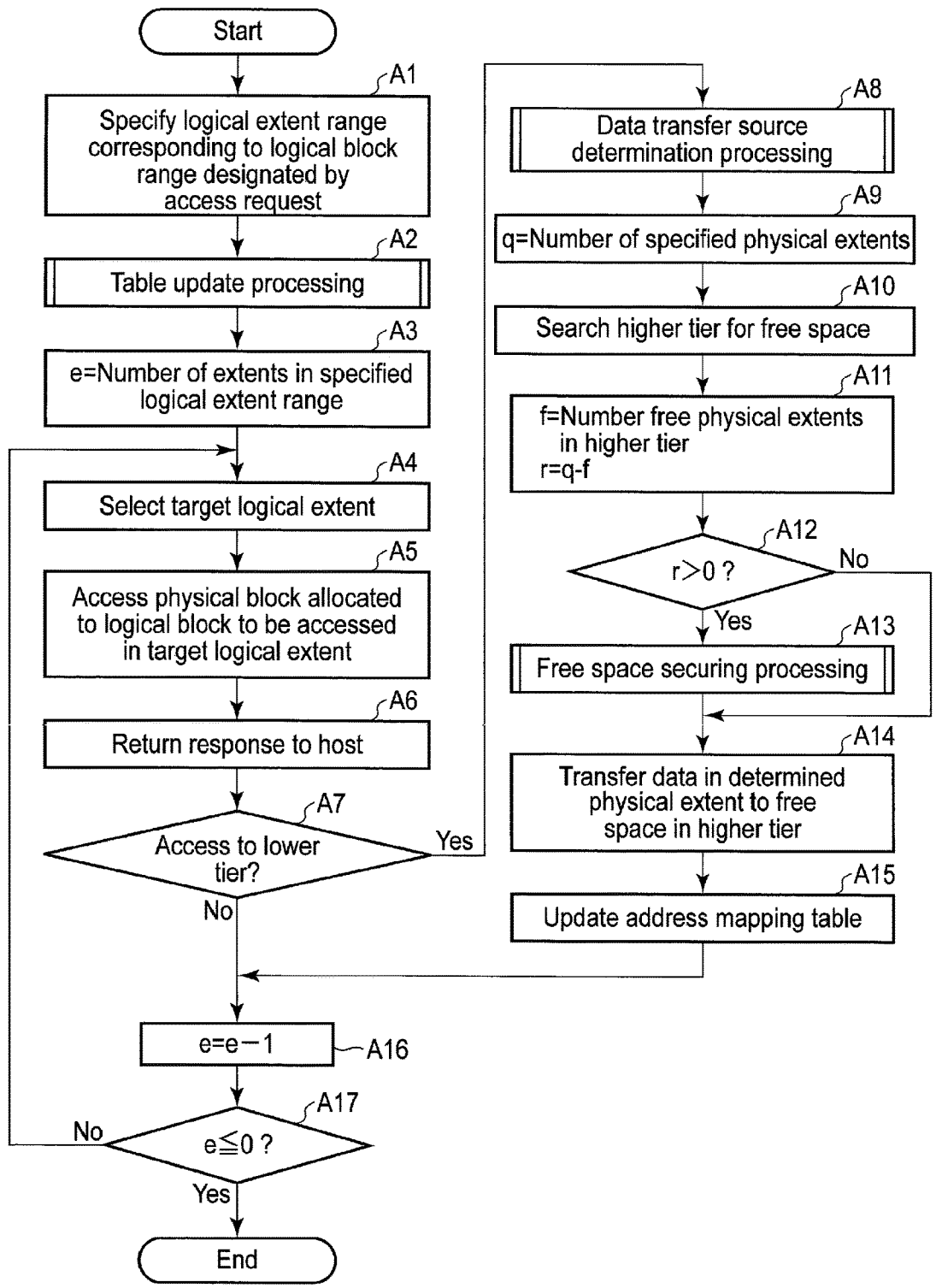
FIG. 9 is a flow chart illustrating a typical procedure of an access processing in the first embodiment.

Now, how the present embodiment operates will be explained based on the criterion for determining whether logical extents have correlation or not with taking an access process as an example and with reference to FIG. 9. FIG. 9 is a flow chart illustrating a typical procedure of an access processing. First, let us suppose that the host 20 should issue an access request via the host interface bus 30 to the storage controller 13 of the tiered storage system 10.

The HIF controller 131 of the storage controller 13 receives from the host interface bus 30 the access request issued by the host 20. The access request includes a logical unit number LUN, a logical block address LBAt and a data transfer size. The data transfer size indicates how many logical blocks should be transmitted (accessed). When the data transfer size is N, the access request should specify access to a range which begins from the logical block address LBAt and comprises continuous N logical blocks.

The IO manager 1353 of the storage controller 13 specifies a logical extent range which corresponds to the logical block range designated by the received access request. This process should be done as follows (Step A1). First of all, the IO manager 1353 refers an entry in the address mapping table 1331, which is associated with a pair which comprises a logical unit number and a logical block address and indicates a logical block in a specified logical block range. And the IO manager 1353 specifies a logical extent indicated by a logical extent number associated with the logical block in the specified logical block range. Thereby the IO manager 1353 specifies a logical extent range which corresponds to the specified logical block range. The specified logical extent range corresponds to the logical block range designated by the access request from the host 20. Accordingly, it may be said that the logical extent range is (indirectly) designated by the access request from the host 20.

When the logical extent range is specified (Step A1), the group manager 1354 is activated. The group manager 1354 executes a table update processing in cooperation with the IO manager 1353, whereby the extent management table 1332 and the extent group management table 1333 are updated based on the specified logical extent range (Step A2).

Figure 11:
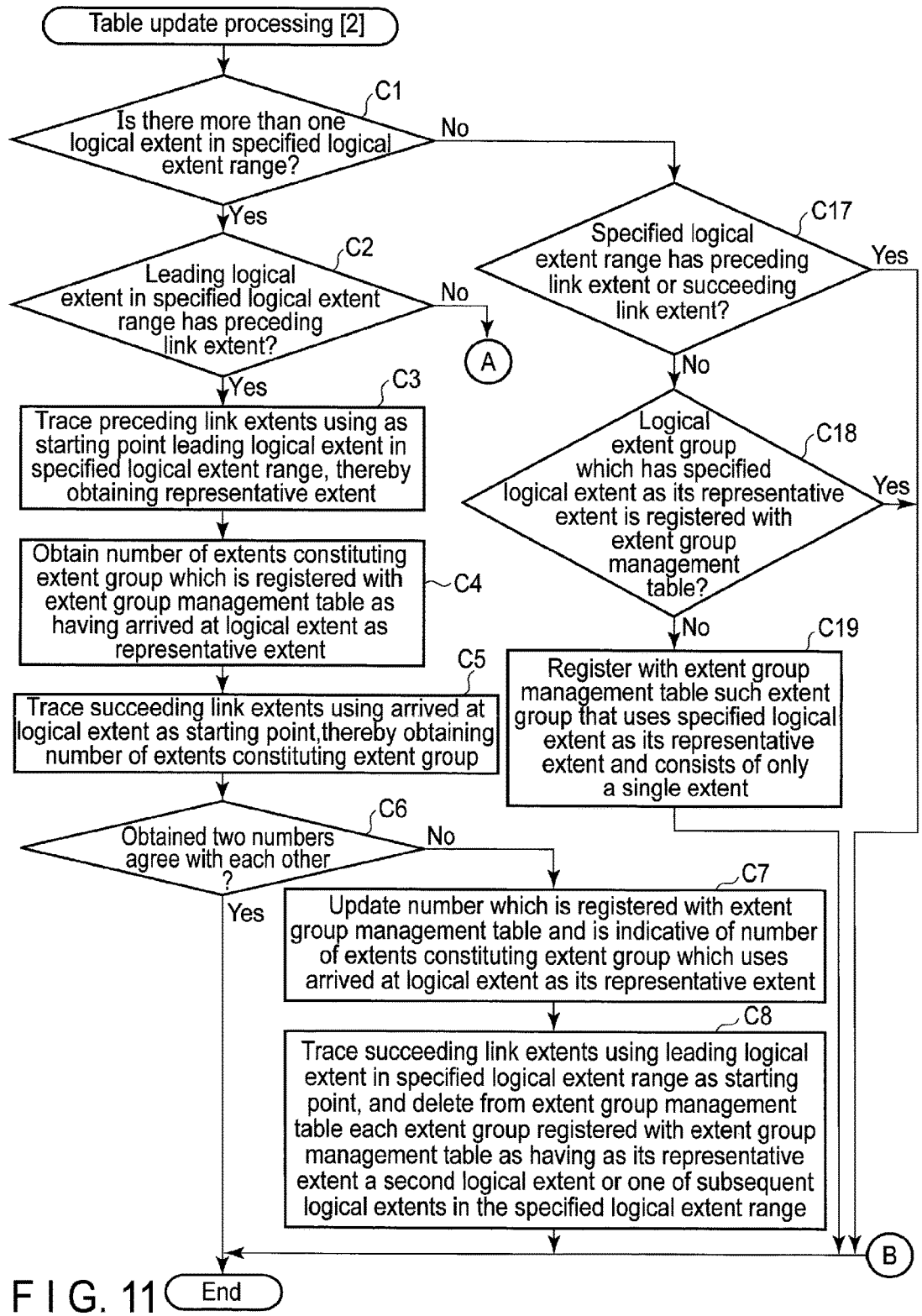
FIG. 11 is a first flow chart illustrating a typical procedure of the table update processing included in the access processing illustrated in FIG. 9 (a table update processing for the extent group management table).
Figure 12:
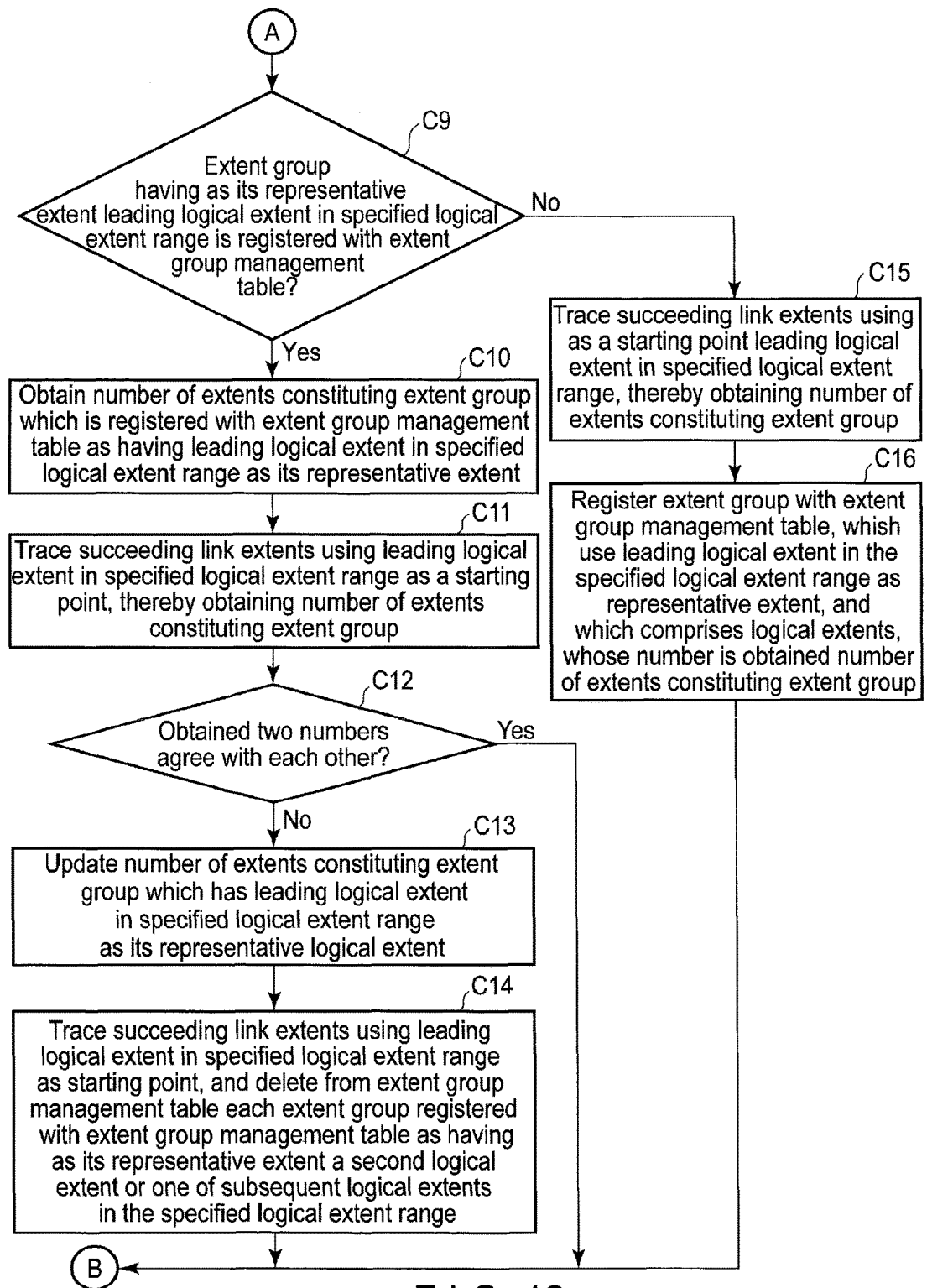
FIG. 12 is a second flow chart illustrating a typical procedure of the table update processing included in the access processing illustrated in FIG. 9 (a table update processing for the extent group management table).

Hereafter, the table update processing (Step A2) will be explained in detail with reference to FIG. 10, FIG. 11 and FIG. 12. FIG. 10 is a flow chart illustrating a typical procedure of a table update processing related to the extent management table 1332 (a table update processing [1]). FIG. 11 and FIG. 12 are flow charts illustrating a typical procedure of a table update processing related to the extent group management table 1333 (a table update processing [2]).

The table update processing (Step A2) comprises the table update processing [1] and the table update processing [2]. The table update processing [1] is first executed, and then the table update processing [2] is executed. First, the table update process [1] is explained with reference to FIG. 10.

The group manager 1354 selects as LE1 (a logical extent LE1) a leading logical extent in the specified logical extent range (Step B1). The group manager 1354 determines whether there exists in the logical extent range a further logical extent which is next to the present logical extent LE1 having been selected at Step B1 (Step B2).

If the specified logical extent range includes a plurality of logical extents, there will be a further logical extent which is next to the present logical extent LE1 (Yes of Step B2). If the specified logical extent range includes a plurality of logical extents, the range of the access request will extend over a plurality of logical extents. In this case, the group manager 1354 selects the next logical extent as LE2 (Step B3). Let us suppose here that a logical extent number (LEN) assigned to the logical extent LE1 should be written as LEN_LE1 whereas a logical extent number (LEN) assigned to the logical extent LE2 should be written as LEN_LE2. Let us further suppose here that an entry which is in the extent management table 1332 and is associated with LE1 should be written as EMTE_LE1 and that an entry which is in the extent management table 1332 and is associated with LE2 should be written as EMTE_LE2.

Subsequently, the group manager 1354 changes the SLE field of the entry EMTE_LE1 from an initial value (which is 0) to LEN_LE2 (Step B4). Moreover, the group manager 1354 updates the substance of the SLI field of the entry EMTE_LE1, and the IO manager 1353 updates the substance of each of the AC field and the LAT field of the entry EMTE_LE1 (step B5). That is, the group manager 1354 makes the substance of the SLI field (initial value 0) increase by one. The IO manager 1353 makes the substance of the AC field (initial value 0) increase by one. The IO manager 1353 updates the substance of the LAT field (initial value 0) so that the current time may be indicated.

Subsequently, the group manager 1354 changes the PLE field of the entry EMTE_LE2 from an initial value (0) to LEN_LE1 (step B6). Moreover, the group manager 1354 updates the substance of the PLI field of the entry EMTE_LE2. The group manager 1354 updates the substance of the PLI field of the entry EMTE_LE2, and the IO manager 1353 updates the substance of each of the AC field and the LAT field of the entry EMTE_LE2 (Step B7). That is, the group manager 1354 makes the substance of the PLI field (initial value 0) increase by one. The IO manager 1353 makes the substance of the AC field (initial value 0) increase by one. The IO manager 1353 updates the substance of the LAT field (initial value 0) so that the current time may be indicated.

Subsequently, the group manager 1354 determines whether there exists a next logical extent (namely, a logical extent next to the present LE2) in the specified logical extent range (Step B8). If there are not any next logical extents (No of Step B8), the group manager 1354 will finish the table update processing which follows the flow chart of FIG. 10 (the table update processing [1]).

On the other hand, if there is a next logical extent (Yes of Step B8), the group manager 1354 will select the present LE2 as a new LE1 (Step B9). Moreover, the group manager 1354 selects as a new LE2 a next logical extent in the specified logical extent range (namely, a logical extent next to the new LE1) (Step B10).

Subsequently, the group manager 1354 changes the SLE field of the entry EMTE_LE1 associated with the new LE1 (namely, the entry EMTE_LE2 associated with the previous LE2) from an initial value (0) to LEN_LE2 (Step B11). Moreover, the group manager 1354 updates the substance of the SLI field of the entry EMTE_LE1 (Step B12). That is, the group manager 1354 makes the substance of the SLI field (initial value 0) increase by one. The group manager 1354 returns to Step B6.

Now, let us suppose a case where it is determined that there is not any next logical extent in Step B2. That is, the specified logical extent range shall include only a single logical extent. If the specified logical extent range includes only a single logical extent, the range specified by the access request will be in the single logical extent. In this case (No of Step B2), the IO manager 1353 updates, similarly to Step B7, the substance of each of the AC field and the LAT field of the entry EMTE_LE1 (Step B13). The group manager 1354 finishes the table update processing which follows the flow chart of FIG. 10 (the table update processing [1]).

Subsequently, the table update processing [2] is explained with reference to FIG. 11 and FIG. 12.

The group manager 1354 determines whether there is more than one logical extent in the specified logical extent range (Step C1). If the specified logical extent range has more than one logical extent (Yes of Step C1), the group manager 1354 will refer to the extent management table 1332, and determines whether a leading logical extent in the specified logical extent range has a preceding link extent (Step C2). If a leading logical extent in the specified logical extent range has a preceding link extent (Yes of Step C2), the leading logical extent ought to belong to an existing extent group along with the preceding extent located immediately near the front of the leading logical extent. Therefore, the group manager 1354 refers to the extent management table 1332 and traces preceding link extents with the use of the leading logical extent as a starting point for the purpose of obtaining a representative extent which is representative of an extent group to which the leading logical extent belongs (Step C3). The group manager 1354 obtains a number of extents constituting the extent group which is registered with the extent group management table 1333 as having arrived at logical extent as representative extent, by referring to the extent group management table 1333 (Step C4). The group manager 1354 refers to the extent management table 1332 and traces succeeding link extents with the use of the arrived at logical extent, i.e., the representative extent as a starting point for the purpose of obtaining a number of extents constituting an extent group, which is registered with the extent management table 1332 having been updated by the table update processing [1] (Step C5). Then, the group manager 1354 compares the number obtained at Step C4 with the number obtained at Step C5 (Step C6).

If the number obtained at Step C4 and the number obtained at Step C5 are in agreement with each other, the specified logical extent range is in the existing extent group. Therefore, the group manager 1354 finishes the table update processing executed in accordance with the flow chart of FIG. 11 and that of FIG. 12 (the table update processing [2]). In contrast to this, if the number obtained at Step C4 and the number obtained at Step C5 are not in agreement with each other (No of Step C6), the extent group found at Step C3 will be made to extend backward and to be united with an extent group which follows the extent group found at Step C3. Therefore, the group manager 1354 updates the extent group management table 1333 in such a manner that the number of extents constituting an extent group which uses the logical extent found at Step C3 as its representative extent is changed into the number obtained at Step C5 (Step C7). Subsequently, the group manager 1354 refers to the extent management table 1332, and traces succeeding link extents with the use of the leading extent in the specified logical extent range as a starting point, and deletes from the extent group management table 1333 each extent group registered with the extent group management table 1333 as having, as its representative extent, a second logical extent or one of subsequent logical extents having been found in the specified logical extent range (Step C8). The group manager 1354 finishes the table update processing executed in accordance with the flow chart of FIG. 11 and that of FIG. 12 (the table update processing [2]).

On the contrary, if it is determined in Step C2 that a leading logical extent in the specified logical extent range does not have a preceding link extent (No of Step C2), then the leading logical extent does not belong to an existing extent group along with a logical extent immediately near the front of the leading logical extent. Therefore, the group manager 1354 determines whether an extent group having as its representative extent the leading extent in the specified logical extent range is registered with the extent group management table 1333 (Step C9). If registered (Yes of Step C9), the group manager 1354 obtains a number of extents constituting the extent group which is registered with the extent group management table 1333 as having a leading logical extent in the specified logical extent range as representative extent, by referring to the extent group management table 1333 (Step C10). The group manager 1354 refers to the extent management table 1332 and traces succeeding link extents with the use of the leading logical extent in the specified logical extent range as a starting point, for the purpose of obtaining a number of extents constituting an extent group, which is registered with the updated extent management table 1332 (Step C11). And the group manager 1354 compares the number obtained at Step C10 with the number obtained at Step C11 (Step C12).

If the number obtained at Step C10 and the number obtained at Step C11 are in agreement with each other (Yes of Step C12), the specified logical extent range is in the existing extent group. Therefore, the group manager 1354 finishes the table update processing executed in accordance with the flow chart of FIG. 11 and that of FIG. 12 (the table update processing [2]).

If the number obtained at Step C10 and the number obtained at Step C11 are not in agreement with each other (No of Step C12), the extent group which has as its representative logical extent the leading logical extent in the specified logical extent range will be made to extend backward and to be united with an extent group which follows the extent group in question. Therefore, the group manager 1354 updates the extent group management table 1333 in such a manner that the number of extents constituting the extent group which has as its representative logical extent the leading logical extent in the specified logical extent range is changed into the number obtained at Step C11 (Step C13). Subsequently, the group manager 1354 refers to the extent management table 1332, and traces succeeding link extents with the use of the leading logical extent in the specified logical extent range as a starting point, and deletes from the extent group management table 1333 each extent group registered with the extent group management table 1333 as having, as its representative extent, a second logical extent or one of subsequent logical extents having been found in the specified logical extent range (Step C14). The group manager 1354 finishes the table update processing executed in accordance with the flow chart of FIG. 11 and that of FIG. 12 (the table update processing [2]).

If the group manager 1354 determines at Step C9 that an extent group having as its representative extent the leading logical extent in the specified logical extent range is not registered with the extent group management table 1333 (No of Step C9), the group manager 1354 refers to the extent management table 1332 and traces succeeding link extents with the use of the leading logical extent in the specified logical extent range as a starting point for the purpose of obtaining a number of extents constituting the extent group (Step C15). The group manager 1354 registers with the extent group management table 1333 an extent group which uses as a representative extent the leading logical extent in the specified logical extent range and which comprises logical extents whose number is the same as the number obtained at Step C15 (Step C16). The group manager 1354 finishes the table update processing executed in accordance with the flow chart of FIG. 11 and that of FIG. 12 (the table update processing [2]).

If the group manager 1354 determines in Step C1 that the specified logical extent range comprises a single logical extent (No of Step C1), the group manager 1354 refers to the extent management table 1332, and determines whether the logical extent in the specified logical extent range has a preceding link extent or a succeeding link extent (Step C17). If the logical extent in the specified logical extent range has a preceding link extent or a succeeding link extent, the logical extent in question belongs to an existing extent group. In this case (Yes of Step C17), the group manager 1354 finishes the table update processing executed in accordance with the flow chart of FIG. 11 and that of FIG. 12 (the table update processing [2]).

If the logical extent in the specified logical extent range does have neither a preceding link extent nor a succeeding link extent (No of Step C17), the group manager 1354 determines whether a logical extent group which has the logical extent in question as its representative extent is registered with the extent group management table 1333 (Step C18). When registered (Yes of Step C18), the group manager 1354 finishes the table update processing executed in accordance with the flow chart of FIG. 11 and that of FIG. 12 (the table update processing [2]). If the group manager 1354 determines that an extent group which has as its representative extent the logical extent in the specified logical extent range is not registered with the extent group management table 1333 (No of Step C18), the group manager 1354 registers with the extent group management table 1333 an extent group which uses as a representative extent the logical extent in the specified logical extent range and which consists of only a single extent (Step C19). The group manager 1354 finishes the table update processing executed in accordance with the flow chart of FIG. 11 and that of FIG. 12 (the table update processing [2]).

Here, how to update the extent management table 1332 and the extent group management table 1333 will be explained in detail with taking a first case as an example with reference to FIG. 13, FIG. 14 and FIG. 15. The first case is a case where a range which the host 20 requests to access is completely within a single logical extent. Let us suppose here that the extent management table 1332 is in an initial state as illustrated in FIG. 6 and the extent group management table 1333 is in an initial state as illustrated in FIG. 7.

If a range which the host 20 requests to access is inside a single logical extent 1 as illustrated in FIG. 13, a logical extent range specified by the access request will be constituted by the logical extent 1 alone. In this case, the IO manager 1353 updates the extent management table 1332. As illustrated in FIG. 14, the entry which holds 1 in the LEN field is updated. Specifically, the substance of the AC field is incremented by one, and the substance of the LAT field is changed to indicate the present time.

In the first case, the group manager 1354 assigns an extent group number to the logical extent 1. Let us suppose that the assigned extent group number shall be 1. The extent group management table 1333 is updated by the group manager 1354 as illustrated in FIG. 15.

Specifically, the extent group whose extent group number is 1 is registered with the extent group management table 1333 (an entry which holds 1 in the EGN field is prepared), the REN field assigned to the entry which holds 1 in the EGN field is changed from 0 to 1 (indicating that the representative logical extent number is 1), and a QTY field assigned to the entry which holds 1 in the EGN field is changed from 0 to 1 (indicating that a number of logical extents constituting an logical extent group is 1).

Subsequently, how to update the extent management table 1332 and the extent group management table 1333 will be explained in detail with taking a second case as an example with reference to FIG. 16, FIG. 17 and FIG. 18. The second case is a case where a range which the host 20 requests to access extends over two logical extents. Let us suppose here similarly to the first case that the extent management table 1332 is in an initial state as illustrated in FIG. 6 and the extent group management table 1333 and is in an initial state as illustrated in FIG. 7.

Figures 15, 16:
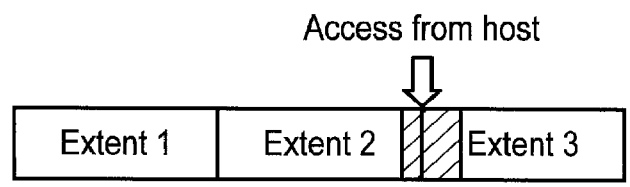
FIG. 15 is a third drawing for explaining how the extent management table and the extent group management table, both illustrated in FIG. 2, will be updated with taking the first case as an example.
FIG. 16 is a first drawing for explaining how the extent management table and the extent group management table, both illustrated in FIG. 2, will be updated with taking a second case as an example.

If a range which the host 20 requests to access extends over the logical extent 1 and the logical extent 2 as illustrated in FIG. 16, a logical extent range specified by the access request will comprise the logical extent 1 and the logical extent 2. In this case, the extent management table 1332 is updated as illustrated in FIG. 17. Specifically, an entry which holds 2 in the LEN field and an entry which holds 3 in the LEN field are updated by the group manager 1354 and the IO manager 1353. More specifically, in the entry which holds 2 in the LEN field, the substance of the SLE field is changed from 0 to 3, the substance of each of the SLI field and the AC field is incremented by one, and the substance of the LAT field is changed to indicate the present time. In the entry which holds 3 in the LEN field, the substance of the PLE field is changed from 0 to 2, the substance of each of the PLI field and the AC field is changed from 0 to 1, and the substance of the LAT field is changed to indicate the present time.

In the second case, the group manager 1354 assigns an extent group number to a set which comprises the logical extent 2 and the logical extent 3. Let us suppose here that the assigned extent group number shall be 1. The extent group management table 1333 is updated by the group manager 1354 as illustrated in FIG. 18. More specifically, an extent group whose extent group number is 1 is registered with the extent group management table 1333 (an entry which holds 1 in the EGN field is prepared), the substance of the REN field assigned to the entry which holds 1 in the EGN field is changed from 0 to 2 (indicating that the representative logical extent number is 2), and the substance of the QTY field assigned to the entry which holds 1 in the EGN field is changed from 0 to 2 (indicating that a number of logical extents constituting a logical extent group is 2).

Subsequently, how to update the extent management table 1332 and the extent group management table 1333 will be explained in detail with taking a third case as an example with reference to FIG. 19, FIG. 20, FIG. 23A and FIG. 23B. The third case is a case where a range which the host 20 requests to access extends over two logical extents which belong to different extent groups.

Figures 19, 20:
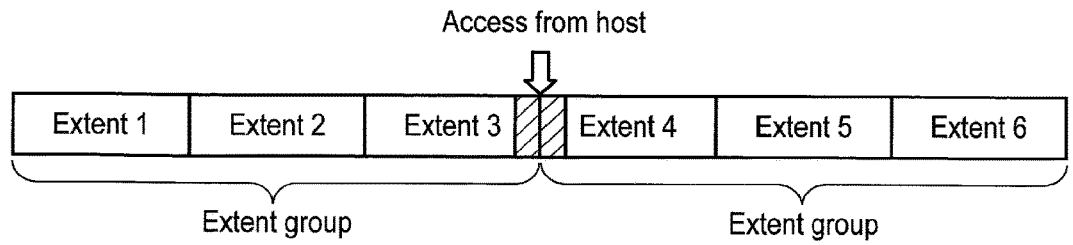
FIG. 19 is a first drawing for explaining how the extent management table and the extent group management table, both illustrated in FIG. 2, will be updated with taking a third case as an example.
FIG. 20 is a second drawing for explaining how the extent management table and the extent group management table, both illustrated in FIG. 2, will be updated with taking the third case as an example.

If a range which the host 20 requests to access extends over the logical extent 3 and the logical extent 4 as illustrated in FIG. 19, a logical extent range specified by the access request comprises the logical extent 3 and the logical extent 4. In this case, the extent management table 1332 is updated as illustrated in FIG. 20. That is, the entry which holds 3 in the LEN field and the entry which holds 4 in the LEN field are updated by the group manager 1354 and the IO manager 1353. More specifically, in the entry which holds 3 in the LEN field, the substance of the SLE field is changed from 0 to 4, the substance of each of the SLI field and the AC field is incremented by one, and the substance of the LAT field is changed to indicate the present time. In the entry which holds 4 in the LEN field, the substance of the PLE field is changed from 0 to 3, the substance of each of the PLI field and the AC field is incremented by one, and the substance of the LAT field is changed to indicate the present time.

Moreover, let us suppose here that, as illustrated in FIG. 19, the logical extent 3 belongs to an extent group which comprises logical extents 1 to 3 and the logical extent 4 belongs to an extent group which comprises logical extents 4 to 6. In an extent group to which the logical extent 3 belongs, the entries associated with the respective logical extents 1 and 2 other than the logical extent 3 have such substances as illustrated in FIG. 20. In an extent group to which the logical extent 4 belongs, the entries associated with the respective logical extents 5 and 6 other than logical extent 4 have such substances as illustrated in FIG. 20. That is, each of the entries which hold 1, 2, 5, and 6 in their respective LEN fields of the extent management table 1332 has such substances in its PLE field, its PLI field, its SLE field, its SLI field, and its AC field as illustrated in, for example, FIG. 20.

In the third case, moreover, the group manager 1354 unifies the extent group to which the logical extent 3 belongs and the extent group to which the logical extent 4 belongs. In other words, the group manager 1354 will update the extent group management table 1333 in such a manner that the extent group to which the logical extent 3 belongs and the extent group to which the logical extent 4 belongs should be unified.

In update of the extent group management table 1333, the group manager 1354 refers to the extent management table 1332, and obtains a representative extent of an extent group to which the logical extent 3, which is the leading logical extents in the range specified by the access request from the host 20, belongs. More specifically, as illustrated in FIG. 21, the group manager 1354 traces the PLE field of the extent management table 1332 with the use of the logical extent 3 as a starting point. If the group manager 1354 arrives at a logical extent whose PLE field is 0, the group manager 1354 will determine that the arrived logical extent should be a representative extent. Here, the logical extent 1 is obtained. After having obtained the representative extent, the group manager 1354 obtains from the updated extent management table 1332 a number of extents constituting an extent group which uses the obtained logical extent as its representative extent. More specifically, as illustrated in FIG. 22, the group manager 1354 traces the SLE field of the extent management table 1332 with the use of the representative extent (the logical extent 1) as a starting point. If the group manager 1354 arrives at a logical extent whose SLE field is 0, the group manager 1354 will determine that the arrived logical extent should be a logical extent that is located at a terminal end in the extent group, and will obtain as a number of extents constituting the extent group there are between the logical extent located at the leading end of the extent group and the logical extent located at the terminal end of the extent group.

Subsequently, the group manager 1354 confirms a number of extents constituting the extent group which is registered with the extent group management table 1333 and which has the logical extent 1 as its representative extent. More specifically, the group manager 1354 confirms what number an entry whose REN field is 1 has in its QTY field. It should be noted that difference between this number and the number obtained by tracing the SLE field of the extent management table 1332 means extension of the extent group. The extent group management table 1333 indicates that an extent group which uses the logical extent 1 as its representative extent comprises three extents. On the other hand, a number obtained by tracing the SLE field of the extent management table 1332 is 6. Consequently, the group manager 1354 first tries to update the extent group management table 1333 in such a manner that the extent group which uses the logical extent 1 as its representative extent comprises 6 logical extents. The group manager 1354 then examines whether the extent group management table 1333 records an extent group which uses as its representative extent such a logical extent that is located after the logical extent 3 and which belongs to an extent group using the logical extent 1 as its representative extent. If it is found that the extent group management table 1333 does record such an extent group, the group manager 1354 updates the extent group management table 1333 for deleting the found extent group from the extent group management table 1333. As a result, the extent group management table 1333 is updated as indicated in FIG. 23B. More specifically, the QTY field of the entry whose REN field is 1 is updated from 3 to 6, and all the fields of the entry whose REN field is 4 are updated to an initial value.

Let us return to the flow chart of FIG. 9. When the table update processing (Step A2) is executed, the IO controller 1352 is activated. At the outset, the IO controller 1352 assigns to a variable e a number of logical extents in a specified logical extent range, in order to execute access requested by the received access request (step A3). The variable e denotes a number indicative of how many logical extents (are not yet accessed and thus) must be accessed.

Subsequently, the IO controller 1352 selects one logical extent which should be next accessed (that is, a target logical extent) from those logical extents that are specified by the variable e which is indicative of a total number of the logical extents (Step A4). Subsequently, the IO controller 1352 accesses as follows physical blocks which are assigned to and the same in number as all the logical blocks which are in a target logical extent and should be accessed (Step A5). Let us suppose here that c denotes a number indicative of how many logical blocks which should be accessed are contained in a target logical extent. In this case, c also denotes a number indicative of how many physical blocks are assigned to the c logical blocks.

The IO controller 1352 first obtains a set of a physical extent number of a physical block assigned to a logical block located at the lead of all the logical blocks which should be accessed in a target logical extent (that is, a leading physical block) and an offset. The set of the physical extent number and the offset is obtained by the IO controller 1352 by referring to the address mapping table 1331 based on the logical block address and the logical extent number of the above mentioned leading logical block.

The IO controller 1352 obtains a set of a physical extent number of a leading physical block and an offset, thereby specifies c physical blocks, which begin from the top physical block and which should be actually accessed, and a storage device (tier) which includes the c physical blocks. And the IO controller 1352 accesses via the SIF controller 132 the specified c physical blocks in the specified storage device. It should be noted that, if an access request is a write access request, and if no physical blocks are assigned to logical blocks in a logical block range specified by the access request, the IO manager 1353 will assign empty physical blocks which are successively located in the high-speed storage device 11 (a higher tier) and which are the same in number as the logical blocks in the logical block range specified by the access request, to the logical blocks in the logical block range upon execution of Step A3, for example.

The IO controller 1352 accesses specified c physical blocks (Step A5), and returns a response via the HIF controller 131 to the host 20 (Step A6). And the IO controller 1352 passes control to the tiering controller 1355. Then, the tiering controller 1355 determines whether or not it was access to the low-speed storage device 12 (a lower tier) (Step A7).

If it is access to a lower tier (Yes of Step A7), it is highly possible that a target logical extent may be accessed in the close future, and thus the tiering controller 1355 will determine that the data in a physical extent assigned to the target logical extent should be moved to a higher tier in order to improve access performance. Moreover, if the target logical extent belongs to the extent group, it is highly possible that all of the remaining logical extents in the extent group will be accessed in the close future, and the tiering controller 1355 will determine that the data in each of the physical extents assigned to the remaining logical extents should also be moved to the higher tier. Consequently, the tiering controller 1355 executes a data transfer source determination processing in order to determine as data transfer source one or more physical extents including a physical extent assigned to a target logical extent (Step A8).

Hereafter, the details of a data transfer source determination processing (Step A8) will be explained with reference to FIG. 24. FIG. 24 is a flow chart which illustrates the typical procedure of the data transfer source determination processing. First, the tiering controller 1355 refers to an entry of the extent group management table 1333, which is corresponded to an extent group to which a target logical extent belongs (Step D1). More specifically, the tiering controller 1355 refers to a QTY field of an entry of the extent group management table 1333, which has in its REN field a number of a representative extent of an extent group to which a target logical extent belongs.

Subsequently, the tiering controller 1355 determines whether the target logical extent belongs to an extent group, which comprises a plurality of logical extents, according to whether numerical values other than one are set to the QTY field referred to (Step D2). If the target logical extent belongs to an extent group which comprises a plurality of logical extents (Yes of Step D2), the tiering controller 1355 will advance to Step D3. In Step D3, the tiering controller 1355 specifies a set of physical extents assigned to all the logical extents in the extent group to which the target logical extent belongs. Moreover, in Step D3, the tiering controller 1355 concludes that all the physical extents, which are in a lower tier and are included in the set of assigned physical extents, are data transfer sources. The concluded data transfer sources include physical extents to which the target logical extents are assigned. And the tiering controller 1355 finishes the data transfer source determination processing.

On the other hand, if the target logical extent does not belong to the extent group which comprises a plurality of logical extents (No of Step D2), the tiering controller 1355 concludes that only the physical extent assigned to the target logical extent is a data transfer source (Step D4). And the tiering controller 1355 finishes the data transfer source determination processing.

Now, let us return to FIG. 9. The access processing will be further explained. When the data transfer source determination processing (Step A8) is executed in accordance with the flow chart of FIG. 24, the tiering controller 1355 will advance to Step A9. In Step A9, the tiering controller 1355 assigns to a variable q a number indicative of how many physical extents are concluded as data transfer sources (Step A9).

Subsequently, the tiering controller 1355 searches the higher tier for free spaces (Step A10). That is, the tiering controller 1355 searches for physical extents (namely, empty physical extents) which are included in the higher tier (the high-speed storage device 11) and which are not assigned to logical extents based on the address mapping table 1331. It should be noted here that, if an empty physical extent list is stored in the memory 133 (the local HDD 134), the tiering controller 1355 may refer to the list and may search the higher tier for empty physical extents, with the proviso that the empty physical extent list keeps an array of physical extent numbers assigned to empty physical extents.

After having searched the higher tier for empty physical extents, the tiering controller 1355 will assign to a variable f a number indicative of how many empty physical extents there are in the higher tier (Step A11). In Step A11, the tiering controller 1355 deducts the variable f from the variable q, and assigns the difference q−f to the variable r. Subsequently, the tiering controller 1355 determines whether the variable r (=q−f) is positive (Step A12).

If the variable r is positive (Yes of Step A12), namely, if q>f is established, the tiering controller 1355 will determine that there is a shortage of r empty physical extents for transferring to the higher tier those data pieces that are in q physical extents determined as data transfer sources. In this case, the tiering controller 1355 executes a free space securing processing for securing at least r new empty physical extents in the higher tier (Step A13). The tiering controller 1355 advances to Step A14.

On the other hand, if the variable r is not positive (No of Step A12), namely, if q−f is established, the tiering controller 1355 will determine that there are sufficient number of empty physical extents for transferring to the higher tier those data pieces that are in q physical extents determined as data transfer sources. In this case, the tiering controller 1355 skips Step A13, and advances to Step A14.

Hereafter, the free space securing processing (Step A13) will be explained in detail with reference to FIG. 25. FIG. 25 is a flow chart which illustrates a typical procedure of the free space securing processing. In the following explanation, a logical extent to which a physical extent in a higher tier is assigned is called a logical extent having a correspondence in a higher tier. Similarly, an extent group comprising a plurality of logical extents to which physical extents, which are in a higher tier and are the same in number as the logical extents, are assigned is called an extent group having a correspondence in a higher tier.

In the free space securing processing, the tiering controller 1355 generates a list about all the extent groups that have their respective correspondences in the higher tier (an extent group which comprises only one extent may be included) (Step E1). The generated list includes element arrays for every extent group. Each element, which is included in the list and is related to an extent group, has for every extent group an extent group number, an access count, and a piece of information about last access time.

In the present embodiment, the tiering controller 1355 uses as an access count indicative of how many times an extent group has been accessed an average value of access counts of the logical extents belonging to the extent group. However, the tiering controller 1355 may use an access count which is the largest in the access counts of the logical extents belonging to the extent group as the access count. Moreover, in the present embodiment, the tiering controller 1355 uses as a piece of information on a last access time indicative of when an extent group has been last accessed a piece of last access time information which indicates a newest last access time in the last access times of the logical extents belonging to the extent group.

In generation of the above mentioned list, the tiering controller 1355 identifies an extent group based on the extent group management table 1333. Moreover, the tiering controller 1355 determines whether the identified logical extent has a correspondence in the higher tier by referring to the address mapping table 1331 based on a logical extent number of a logical extent. That is, the tiering controller 1355 determines whether the identified extent group has a correspondence in the higher tier by referring the address mapping table 1331 based on a logical extent number of a logical extent in the specified extent group has. That is, the tiering controller 1355 determines based on a physical extent number of a physical extent assigned to a logical extent in the identified extent group whether the logical extent in the identified extent group has a correspondence in the higher tier. Based on this determination result, the tiering controller 1355 determines whether the identified extent group has a correspondence in the higher tier.

When generating the above mentioned list, the tiering controller 1355 sorts all the elements in the list based on their respective access counts (more specifically, their respective access counts and their respective last access times) (for example, in ascending order of access counts) (Step E2). When the sort makes it clear that some elements are the same as one another in access count, the tiering controller 1355 determines which elements are older in last access time and places the older elements in the lower rank. Let us assume here for simplification of explanation that, if a certain element is higher (lower) in rank than any other elements, the element in question is considered as larger (smaller) in access count than the other elements. Moreover, an element which is the smallest in access count shall be treated as the lowest in rank.

Subsequently, the tiering controller 1355 assigns the number of the elements in the generated list to a variable x as an initial value (Step E3). The variable x is used as a pointer which indicates a position (or a rank) where an element (an element after sorting) is located in the generated list. Therefore, in the following explanation, the variable x is called the pointer x. In Step E3, the tiering controller 1355 assigns an initial value 0 to a variable y. The variable y indicates a count indicative of how many data pieces are transferred from the higher tier to the lower tier in the free space securing process, i.e., a count indicative of how many empty physical extents are newly secured in the higher tier.

Subsequently, the tiering controller 1355 determines whether an element which is in the list and is specified with the pointer x (that is, an element placed in x-th order) is an extent group which comprises a plurality of logical extents (Step E4). If the element in the x-th order is an extent group which comprises a plurality of logical extents (Yes of Step E4), the tiering controller 1355 will transfer those data pieces that are in the physical extents, which are assigned to the logical extents in the extent group of the x-th order and which are the same in number as the logical extents, from the higher tier (the high-speed storage device 11) to the free spaces in the lower tier (the low-speed storage device 12) (Step E5). Such data piece transfer makes it possible for the tiering controller 1355 to newly secure as empty physical extents (free spaces) such physical extents that are in the higher tier, are assigned to logical extents in the extent group in the x-th order, and are the same in number as the logical extents.

Subsequently, the tiering controller 1355 increments the variable y by a number which is as large as the total number of the physical extents from which data pieces have been transferred by execution of Step E4 (Step E6). The tiering controller 1355 advances to Step E9.

On the other hand, if the element in the x-th order is not an extent group which comprises a plurality of logical extents (No of Step E4), i.e., if the element in the x-th order is an extent group which comprises one extent, the tiering controller 1355 transfers this data piece that is in a physical extent assigned to a logical extent in the extent group of the x-th order (an extent group which comprises one extent) from the higher tier to a free space in the lower tier (Step E7). Such data piece transfer makes it possible for the tiering controller 1355 to secure as an empty physical extent such a physical extent that is in the higher tier, and is assigned to the logical extent in the extent group in the x-th order (an extent group which comprises one extent). Subsequently, the tiering controller 1355 increments the variable y by one, and advances to Step E9.

In Step E9, the tiering controller 1355 updates the address mapping table 1331 to reflect the data piece transfer in Step E5 or Step E7. That is, if Step E9 is executed following the execution of Step E5, the tiering controller 1355 will update the address mapping table 1331 in such a manner that (the physical blocks in) the physical extents which are assigned to (the logical blocks in) the logical extents in the extent group in the x-th order and which are the same in number as the logical extents in the extent group in the x-th order will be changed from (the physical blocks in) the physical extent group which is the data transfer source in Step E5 to (the physical blocks in) the physical extent group which is the data transfer destination in Step E5. On the other hand, if Step E9 is executed following the execution of Step E7, the tiering controller 1355 will update the address mapping table 1331 in such a manner that the physical extent which is assigned to the logical extent in the extent group in the x-th order (the extent group comprising one extent) is changed from the physical extent of the data transfer source in Step E7 to the physical extent of the data transfer destination in Step E7.

After having updated the address mapping table 1331, the tiering controller 1355 advances to Step E10. In Step E10, the tiering controller 1355 determines whether the variable y updated at Step E6 or Step E8 is greater than the variable r. If the variable y is greater than or equal to the variable r (Yes of Step E10), the tiering controller 1355 will determine that at least r new empty physical extents have been secured in the higher tier by the free space securing process. Consequently, the tiering controller 1355 finishes the free space securing processing.

On the other hand, if the variable y is not greater than or equal to the variable r (No of Step E10), the tiering controller 1355 will determine that at least r new empty physical extents are not yet secured in the higher tier. Consequently, the tiering controller 1355 continues the free space securing processing as follows.

The tiering controller 1355 decrements the pointer x by one (Step E11). The tiering controller 1355 returns to Step E4. The tiering controller 1355 determines whether an element which is in the list and is specified by the decremented pointer x is an extent group which comprises a plurality of logical extents. The element used for this determination is clearly one rank higher than the element used for the previous determination. Subsequent operations are the same as the operation after the last determination. Steps E4 to E11 are repeatedly executed until at least r new empty physical extents are secured in the higher tier.

Let us return to FIG. 9. The access processing will be explained further. After executing the free space securing processing in accordance with the flow chart of FIG. 25 (Step A13), the tiering controller 1355 advances to Step A14. At this moment, there are at least f+r(=q) empty physical extents in the higher tier. Consequently, the tiering controller 1355 transfers data pieces in q physical extents concluded by the data transfer source determining process (Step A8) to the free spaces (specifically, q empty physical extents) in the higher tier (Step A14). Even if the free space securing processing (Step A13) is skipped over (No of Step A12), the tiering controller 1355 will execute the above mentioned transfer of data pieces (Step A14).

Subsequently, the tiering controller 1355 updates the address mapping table 1331 and the extent management table 1332 so that the transfer of data pieces in Step A14 may be reflected in them (Step A15). That is, the tiering controller 1355 updates the address mapping table 1331 in such a manner that (physical blocks in) q physical extents in a data transfer source are assigned to (logical blocks in) q logical extents to which (physical blocks in) q physical extents in a data transfer destination are assigned.

After the tiering controller 1355 has finished executing Step A15, the tiering controller 1355 returns control to the IO controller 1352. Then, the IO controller 1352 decrements the variable e by one (Step A16). And the IO controller 1352 determines whether the variable e having been decremented by one is zero or less (Step A17). If the variable e having been decremented by one is zero or less (Yes of Step A17), the IO controller 1352 will determine that access to all the logical extents in the specified logical extent range has completed. Consequently, the IO controller 1352 finishes the access processing having been executed in accordance with the flow chart of FIG. 9.

On the other hand, if the variable e having been decremented by one is not zero or less (No of Step A17), the IO controller 1352 determines that there still exist in the specified logical extent range e logical extents which are not yet accessed. Consequently, the IO controller 1352 returns to Step A4, and selects as a target logical extent from the e logical extents which are not yet accessed (a number which is indicated by the variable e) a logical extent which follows a logical extent having been last accessed. The processes which follow Step A4 (and include Steps A5 to A7) will be executed similarly to the case where a target logical extent is first selected at Step A4.

If there exists in the lower tier a physical extent which is assigned to the target logical extent selected at the first Step A4 (Yes of Step A7), data transfer from the lower tier to the higher tier will be executed at the first Step A14. Moreover, if the target logical extent selected at the first Step A4 belongs to the extent group which comprises a plurality of logical extents, a set of the physical extents assigned to all the logical extents in an extent group after execution of the first Step A14 ought to exist in the higher tier. Accordingly, a physical extent assigned to the target logical extent selected by the second Step A4 must exist in the higher tier (No of Step A7). In this case, Steps A8 to A15 will be skipped, and Step A16 will be executed.

It should be noted here that, if a physical extent assigned to the target logical extent selected at the first Step A4 exists in the higher tier (No of Step A7), Steps A8 to A15 will be also skipped, and Step A16 will be executed. And if a physical extent assigned to the target logical extent selected at second Step A4 exists in the lower tier (Yes of Step A7), Step A8 will be executed.

In the present embodiment, the tiering controller 1355 executes Step A14, which is a constituent of the access processing provoked by the access request, and transfers to the higher tier the data pieces stored in all the physical extents which are in the lower tier and are included in the set of the physical extents assigned to all the logical extents in the extent group to which the logical extent range specified by the access request from the host 20 belongs. In comparison with the data transfer between the tiers based on the conventionally executed periodical access frequency evaluation, this data transfer has a small overhead and will be executed for a short time.

Any logical extents in an extent group to which a specified logical extent range belongs may be closely related with one another and thus may be accessed simultaneously. Therefore, even if any logical extent in the extent group to which the specified logical extent range belongs has a small access count, it will be highly possible that the logical extent in question will be accessed in the near future. In the present embodiment, the above mentioned data transfer ensures that all the data pieces in (the physical extents assigned to) the logical extents in the extent group exist in the higher tier. Accordingly, if access to any logical block range in the above mentioned extent group will be requested in the near future, the IO controller 1352 could access at high-speed the physical block range which corresponds to the logical block range to which access is requested, because the required data pieces have been already transferred to the higher tier.

In the flow chart of FIG. 9, immediately after the variable e has been decremented (Step A16), an assessment of the variable e will be made (Step A17). However, for example, the assessment of the variable e may be made immediately before a target logical extent is selected (Step A4). If the variable e is not zero or less, the IO controller 1352 will advance to Step A4. If the variable e is zero or less, the IO controller 1352 finishes the access processing having been executed in accordance with the flow chart of FIG. 9. After the variable e has been decremented (Step A16), the IO controller 1352 should return to the assessment of the variable e which will be made immediately before Step A4.

In this way, the present embodiment makes it possible to increase the efficiency of data transfer between the tiers.

Now, separation of an extent group will be explained. An extent group may grow larger with the passage of time. As an extent group grows larger, it will take more time to transfer data pieces in (the physical extents assigned to) all the logical extents in the extent group from a lower tier to a higher tier, for example. Consequently, a large extent group is subjected to a group separating processing and is divided into two extent groups.

Figure 26:
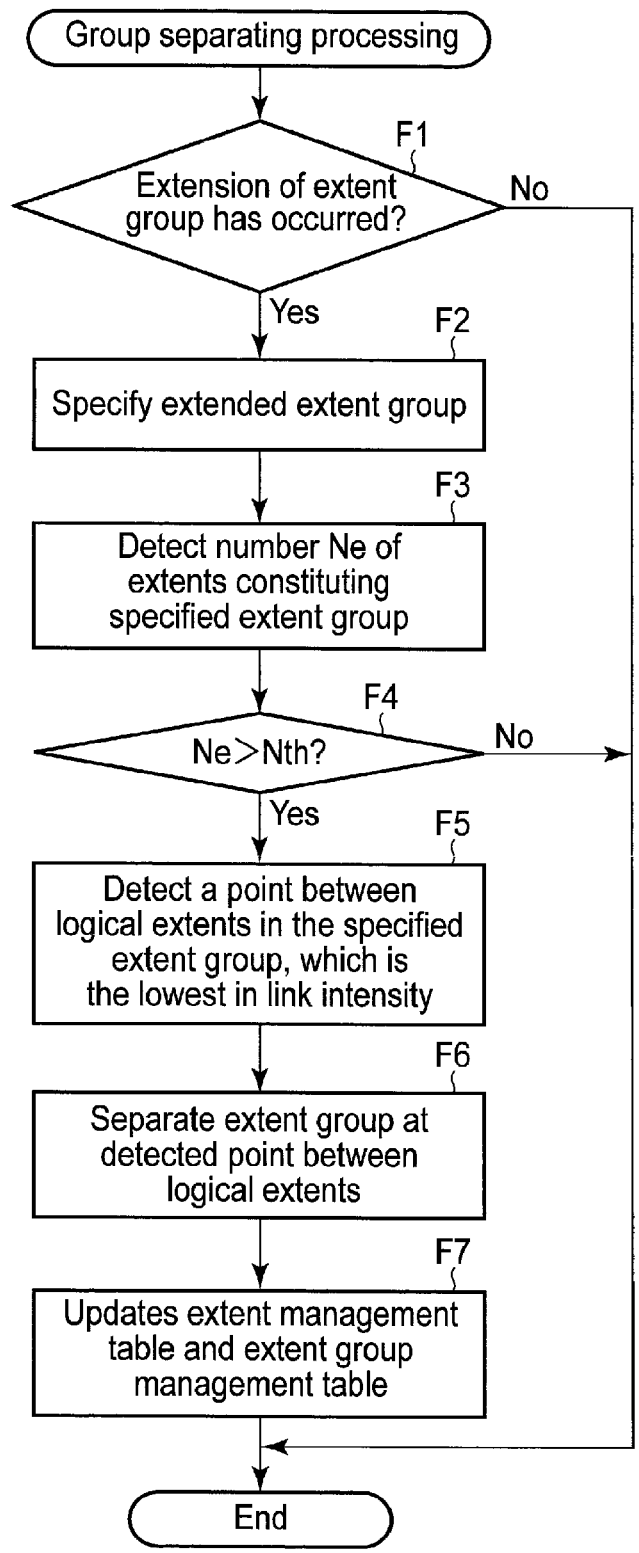
FIG. 26 is a flow chart illustrating a typical procedure of a group separating processing in the first embodiment.

Hereafter, the group separating processing will be explained with reference to FIG. 26. FIG. 26 is a flow chart which illustrates a procedure of the group separating processing. In the access process illustrated in the flow chart of FIG. 9, for example, the group separating processing should be added just before Step A3 (namely, immediately after Step A2). Accordingly, if necessary, the group separating processing may be inserted between Step A2 and step A3 in the flow chart of FIG. 9.

The group manager 1354 determines whether the update of the extent group management table 1333 performed at Step A2 of FIG. 9 brings about extension of an extent group (Step F1). It should be noted that extension of an extent group means that extents which constitute an extent group will increase in number.

If extension of an extent group has not occurred (No of Step F1), the group manager 1354 will determine that group separation will be unnecessary. In this case, the group manager 1354 finishes the group separating processing, and advances to Step A3 of FIG. 9.

On the other hand, if extension of an extent group has occurred (yes of Step F1), the group manager 1354 specifies an extended extent group (Step F2). Subsequently, the group manager 1354 refers to the extent group management table 1333 for detecting a number Ne indicative of how many extents constitute the specified extent group (Step F3).

Subsequently, the group manager 1354 determines whether the detected number Ne is over the threshold value Nth (Step F4). The threshold value Nth is a reference value for determining whether the specified extent group has grown large. A value assigned to the threshold value Nth in the present embodiment is, for example, ½ which is a certain rate of the maximum number of the extents which the higher tier (the high-speed storage device 11) can hold. However, the threshold value Nth may be another value.

If Ne is not over Nth (No of Step F4), the group manager 1354 will determine that it will be unnecessary to separate the identified extent group. In this case, the group manager 1354 finishes the group separating processing, and advances to Step A3 of FIG. 9.

In contrast to this, if Ne is over Nth (Yes of Step F4), the group manager 1354 detects a point between logical extents in the specified extent group, which is the lowest in link intensity (Step F5). If two or more points between logical extents which are the lowest in link intensity are detected, a point nearest to the middle of the extent group will be selected, for example.

The group manager 1354 separates the extent group at the detected point between logical extents (Step F6), and updates both the extent management table 1332 and the extent group management table 1333 (Step F7). More specifically, the group manager 1354 updates the extent management table 1332 in such a manner that a logical extent which is in front of the detected logical extent is made to have original values in its respective succeeding link extent and succeeding link intensity and that a logical extent which is behind the detected logical extent is made to have original values in its respective preceding link extent and preceding link intensity. The group manager 1354 changes a number of extents constituting a registered extent group into a number of extents constituting the front extent group produced by the separation. The group manager 1354 updates the extent group management table 1333 to separately register the back extent group produced by the separation.

The group manager 1354 separates the group (Step F7) and finishes the group separating processing. Then Step A3 in the flow chart of FIG. 9 will be executed. It should be noted that it is not necessary to execute the group separating processing immediately before step A3, but there is nothing wrong with executing the group separating processing immediately after step A3, for example.

Second Embodiment

Now, a second embodiment will be explained.

Similarly to the first embodiment, a tiered storage system in the second embodiment shall be included in a computer system which comprises a tiered storage system 10 and a host 20. Hereafter, those elements that are the same as those of the first embodiment will be given those symbols that are the same as those of the first embodiment and their explanation will be omitted.

In the first embodiment, extent group which comprises those logical extents that have been accessed by a single command from the host 20 and thus have been determined to be correlated with each other is managed using the extent management table 1332 and the extent group management table 1333. In contrast to this, the second embodiment makes it possible to transfer data pieces from one tier to another tier in a hierarchy without using the extent management table 1332 and the extent group management table 1333.

FIG. 27 is a block diagram mainly illustrating a typical functional structure of a storage controller 13 2 in the second embodiment. The second embodiment is different from the first embodiment in that logical extent information 1334 is used instead of the extent management table 1332 and the extent group management table 1333.

Figure 28:
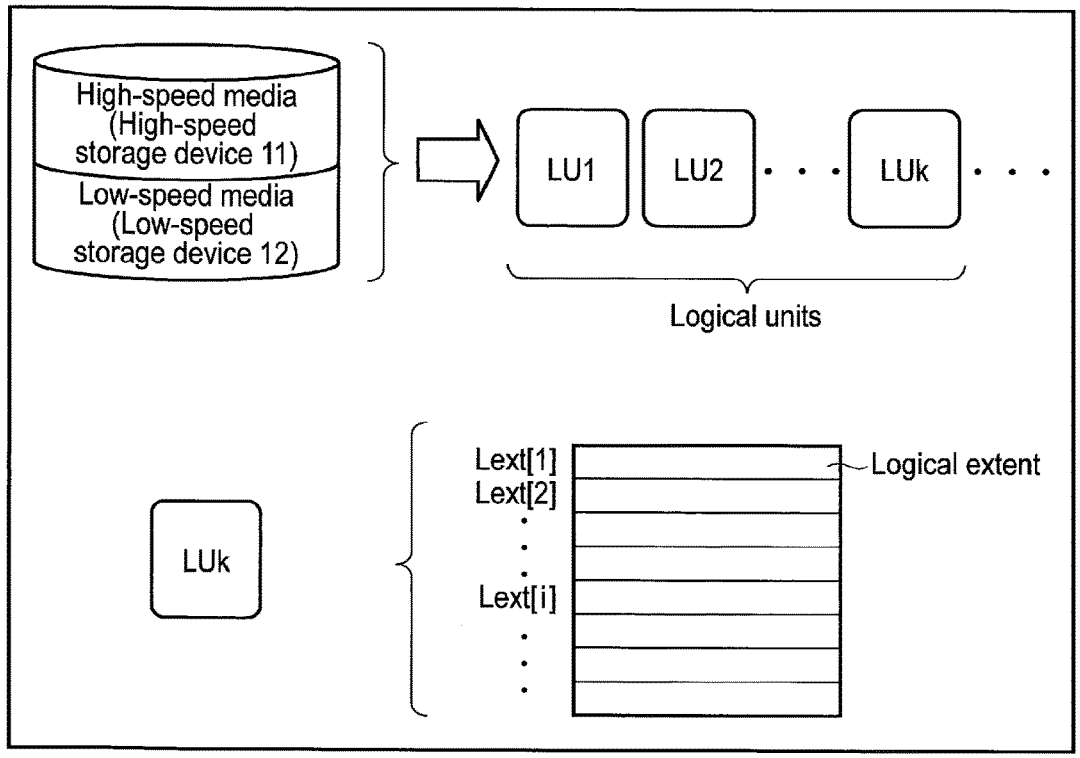
FIG. 28 is a view illustrating an example in which a storage area of a high-speed medium and a storage area of a low-speed medium are virtualized to provide at least one logical unit.
Figure 29:
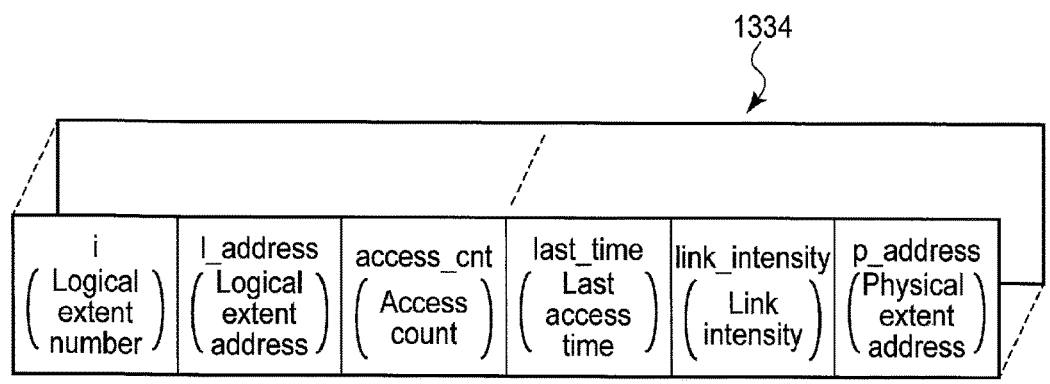
FIG. 29 is a view illustrating an exemplary data structure of logical extent information illustrated in FIG. 27.

As has been explained in the first embodiment, the configuration manager 1351 virtualizes a storage area, which a high-speed media (the high-speed storage device 11) has, and a storage area, which a low-speed media (the low-speed storage device 12) has, and provides at least one logical unit, as illustrated in FIG. 28, for example. The logical extent information 1334 is created for a logical unit when the configuration manager 1351 creates the logical unit. The logical extent information 1334 comprises an array of data structures which are the same in number as logical extents included in a logical unit. One of the data structures is illustrated in FIG. 29 as a data structure Lext[i], for example. Each data structure comprises a logical extent number (i) field, a logical extent address (l_address) field, an access count (access_cnt) field, a last access time (last_time) field, a link intensity (link_intensity) field, and a physical extent address (p_address) field. Each data structure is provided with an index for performing search which uses the logical extent number (i) field as a key, for example. In addition, each data structure may be provided with a sub-index for rearranging and referring to the array based on the substance of the access count (access_cnt) field, for example. Hereafter, in order to make the following explanation intelligible, the data structure (Lext [1]) associated with the logical extent 1, for example, may be sometimes called a piece of logical extent information 1334 associated with the logical extent 1.

Moreover, the logical extent information 1334 can play a role of the address mapping table 1331, because it includes the logical extent address (l_address) field and the physical extent address (p_address) field. That is, it is possible that not only the extent management table 1332 and the extent group management table 1333 are not used but also the address mapping table 1331 is not used. Conversely, using the address mapping table 1331 makes it possible to exclude from the logical extent information 1334 the logical extent address (l_address) field and the physical extent address (p_address) field.

Now, how to update the logical extent information 1334 will be explained with taking a first case as an example with reference to FIG. 30. The first case is a case where a range which the host 20 requests to access is in a single logical extent.

If a range which the host 20 requests to access is in a single logical extent, the IO manager 1353-2 will update the logical extent information 1334 in such a manner that the access count (access_cnt) field associated with the logical extent in question will be incremented by one and the last access time (last_time) field associated with the logical extent in question will indicate the present time.

Subsequently, how to update the logical extent information 1334 will be explained with taking a second case as a specific example with reference to FIG. 31. The second case is a case where a range which the host 20 requests to access extends over two logical extents.

If a range which the host 20 requests to access extends over two logical extents, a logical extent 1 and a logical extent 2 as illustrated in FIG. 31, the IO manager 1353-2 will update the logical extent information 1334 as follows: A data structure associated with the logical extent 1 (a data structure which holds 1 in its logical extent number (i) field) is updated in such a manner that its access count (access_cnt) field is incremented by one, and that its last access time (last_time) field is changed to indicate the present time. Moreover, the IO manager 1353-2 further updates the logical extent information 1334 as follows: A data structure associated with the logical extent 2 (a data structure which holds 2 in its logical extent number (i) field) is updated in such a manner that its access count (access_cnt) field is incremented by one, that its last access time (last_time) field is changed to indicate the present time, and that its link intensity (link_intensity) field is incremented by one. Namely, in the present embodiment, if a range which the host 20 requests to access extends over two logical extents, the logical extent information 1334 will be updated in such a manner that only the link intensity (link_intensity) field associated with the back logical extent will be incremented by one. In other words, the link intensity (link_intensity) field, which is in the logical extent information 1334, indicates a link intensity between the front logical extent and the logical extent in question.

Figure 32:
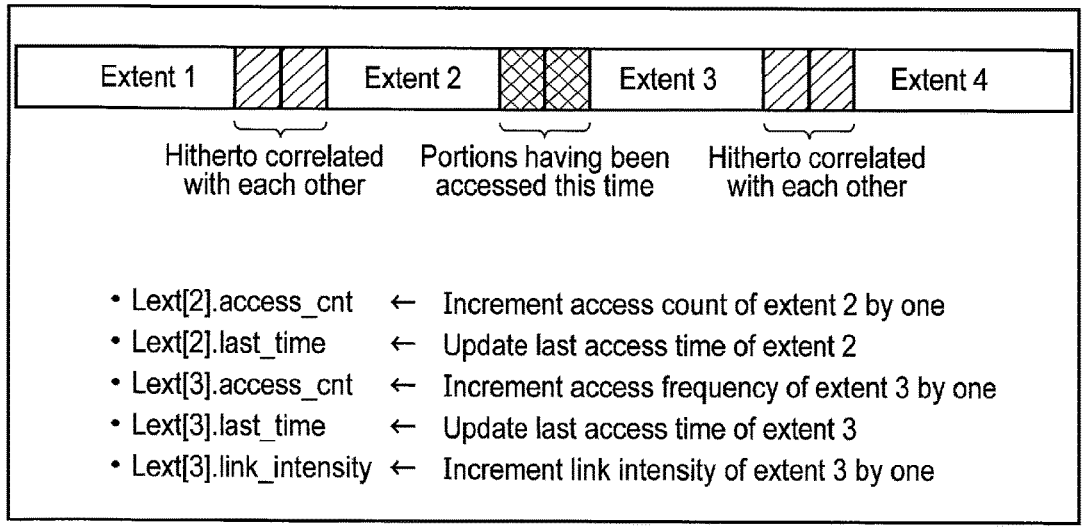
FIG. 32 is a view for explaining how the logical extent information illustrated in FIG. 27 will be updated with taking a third case as an example.

Subsequently, how to update the logical extent information 1334 will be explained with taking a third case as an example with reference to FIG. 32. The third case is a case where a range which the host 20 requests to access extends over two logical extents, a front logical extent and a back logical extent, and that the front logical extent is correlated with a logical extent which is in front of the front logical extent, and that the back logical extent is correlated with a logical extent which is behind the back logical extent.

Now, let us assume here that a range which the host 20 requests to access extends over two logical extents, a logical extent 2 and a logical extent 3. Let us further assume that the logical extent 2 is correlated with a logical extent 1 located in front of the logical extent 2, and that the logical extent 3 is correlated with a logical extent 4 located behind the logical extent 3, as illustrated in FIG. 32. In this case, the IO manager 1353-2 also updates the logical extent information 1334 similarly to the above mentioned second case. More specifically, the IO manager 1353-2 updates the logical extent information 1334 as follows: A data structure associated with the logical extent 2 (a data structure which holds 2 in its logical extent number (i) field) is updated in such a manner that its access count (access_cnt) field is incremented by one, and that its last access time (last_time) field is changed to indicate the present time. Moreover, the IO manager 1353-2 further updates the logical extent information 1334 as follows: A data structure associated with the logical extent 3 (a data structure which holds 3 in its logical extent number (i) field) is updated in such a manner that its access count (access_cnt) field is incremented by one, that its last access time (last_time) field is changed to indicate the present time, and that its link intensity (link_intensity) field is incremented by one.

Subsequently, it will be explained with reference to FIG. 33 and FIG. 34 how the tiering controller 1355-2 manages a set of logical extents, which are correlated with one another, as an extent group based on the logical extent information 1334, which is updated as mentioned above.

Figure 33:
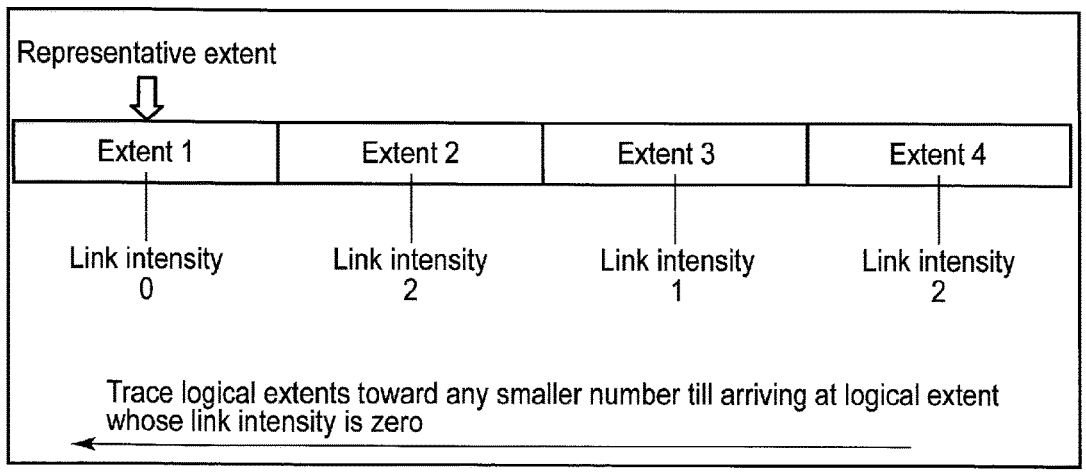
FIG. 33 is a view for explaining how to search for a representative extent in the second embodiment.

FIG. 33 is a view for explaining how to search for a representative extent in an extent group which is a set of such logical extents that are correlated with one another. Let us suppose here that four logical extents 1 to 4 shall be treated as an extent group, as illustrated in FIG. 33.

Under such circumstances, each of the logical extents 2 to 4 has a link intensity which is other than zero. Even if one of the logical extents 1 to 4 should fall in a range to which access should be requested, the tiering controller 1355-2 could find a representative extent by tracing, using the one of the logical extents 1 to 4 as a starting point, forward the logical extents (in a direction in which logical extent number should decrease) till arriving at a logical extent whose link intensity should be zero. That is, it is possible to recognize that the logical extent 1 is a representative extent.

FIG. 34 is a view for explaining how to examine how many extents constitute an extent group which is a set of those logical extents that are correlated with one another.

Once the tiering controller 1355-2 finds out a representative extent, the tiering controller 1355-2 traces backward the logical extents (in a direction in which logical extent number increases) till it arrives at a logical extent whose link intensity is zero with the representative extent as a starting point, whereby the tiering controller 1355-2 examines how many extents constitute the extent group. More specifically, the tiering controller 1355-2 finally arrives at a logical extent whose link intensity is zero. Then, the tiering controller 1355-2 determines that a series of logical extents from the found representative extent to a logical extent which is immediately before the logical extent whose link intensity is zero constitutes an extent group. Thereby the tiering controller 1355-2 acquires how many extents constitute the extent group. Namely, the tiering controller 1355-2 can examine how many extents constitute an extent group simply by tracing backward the successive logical extents, each having a link intensity whose value is other than zero.

As described above, it is possible for the tiering controller 1355-2 based on the logical extent information 1334 not only to discover a representative extent representative of an extent group to which a logical extent falling in a range to which access is requested but also to acquire how many extents constitute the extent group. Therefore, it is possible for the tiering controller 1355-2 to perform data transfer between two tiers in a hierarchy per extent group without using the extent management table 1332 and the extent group management table 1333.

As apparent form the above, any of the above embodiments will improve efficiency of data transfer between two tiers in a hierarchy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A tiered storage system comprising:
a first storage device positioned at a higher tier;
a second storage device positioned at a lower tier; and
a storage controller configured to control access to the first storage device and the second storage device,
wherein the storage controller is configured to:
manage an extent management table holding at least front link extent identifiers and back link extent identifiers each associated with a respective one of a plurality of logical extents to which storage areas of the first and second storage devices are assigned in units of physical extents each comprising a plurality of physical blocks, each of the logical extents comprising a plurality of logical blocks each having a same size as that of a respective one of physical blocks, the front link extent identifiers being indicative of a logical extent located upstream of a corresponding logical extent, and accessed by the same access request along with the corresponding logical extent, the back link extent identifiers being indicative of a logical extent located downstream of the corresponding logical extent, and accessed by the same access request along with the corresponding logical extent;
determine, when a range of an access request from a host computer to a logical unit including the plurality of logical extents extends over some of logical extents in the logical unit, that these logical extents are correlated with each other; and
specify a leading logical extent of each of extent groups by tracing the front link extent identifiers registered in the extent management table, a set of the correlated logical extents being handled as one extent group;
obtain the number of logical extents belonging to each extent group by tracing the back link extent identifiers registered in the extent management table from the leading logical extent as a starting point;
manage an extent group management table holding at least representative extent identifiers each indicative of the leading logical extent of each extent group, and the number of logical extents belonging to each extent group; and
collectively transfer data stored in physical extents each associated with each respective one of the logical extents belonging to each extent group between the first storage device and the second storage device based on the extent management table and the extent group management table.

2. The tiered storage system of claim 1, wherein the storage controller is configured to updates, when the range of the access request from the host computer extends over two or more logical extents belonging to different extent groups, the extent group management table to integrate two or more extent groups to which the two or more logical extents belong into a single extent group.

3. The tiered storage system of claim 1, wherein:
the extent management table holds the number of accesses to a corresponding logical extent; and
the storage controller is configured to
calculate, when transferring data stored in a physical extent in the first storage device to a physical extent in the second storage device to reserve an empty physical extent in the first storage device, the number of accesses to each of the extent groups, whose all logical extents are associated with the physical extents in the first storage device based on the number of accesses held in the extent management table, and
select, based on the calculated result, an extent group to be subjected to data transfer from the physical extent in the first storage device to the physical extent in the second storage device.

4. The tiered storage system of claim 1, wherein:
the extent management table holds a preceding link intensity and a succeeding link intensity, the preceding link intensity being indicated by the number of accesses to an associated logical extent by the same access request along with a logical extent located upstream of the associated logical extent, the succeeding link intensity being indicated by the number of accesses to an associated logical extent by the same access request along with a back logical extent located downstream of the associated logical extent; and the storage controller is configured to update, when the number of logical extents belong to an extent group exceeds a threshold value, the extent management table and the extent group management table based on the preceding link intensity and the succeeding link intensity held in the extent management table to divide the extent group into two extent groups.

5. A tiered storage system comprising:
a first storage device positioned at a higher tier;
a second storage device positioned at a lower tier; and
a storage controller configured to control access to the first storage device and the second storage device,
wherein the storage controller is configured to:
manage logical extent information each associated with a respective one of the plurality of logical extents to which storage areas of the first and second storage devices are assigned in units of physical extents each comprising a plurality of physical blocks, each of the logical extents comprising a plurality of logical blocks each having a same size as that of a respective one of physical blocks, the logical extent information including at least a link intensity indicated by the number of accesses to a corresponding logical extent by the same access request along with a logical extent located upstream of the corresponding logical extent;
determine, when a range of an access request from a host computer to a logical unit including the plurality of logical extents extends over some of logical extents in the logical unit, that these logical extents are correlated with each other;
identify a leading logical extent of each extent group by tracing the logical extent information upstream to the leading logical extents along an arranged order, till arriving at a logical extent whose number of accesses is zero, a set of the correlated logical extents being handled as one extent group;
acquire the number of logical extents belonging to each extent group by tracing the logical extent information downstream along the arranged order of the logical extents from the leading logical extent as a starting point while logical extents whose number of accesses in the logical extent information is other than zero; and
collectively transfer data stored in physical extents each associated with each respective one of the logical extents belonging to each extent group between the first storage device and the second storage device based on the identified leading logical extent of each extent group and the acquired number of logical extents belonging to each of the extent group.

6. The tiered storage system of claim 5, wherein:
the logical extent information includes the number of accesses to a corresponding logical extent; and
the storage controller is configured to
calculate, when reserving an empty physical extent in the first storage device by transferring data stored in a physical extent in the first storage device to a physical extent in the second storage device, the number of accesses of each of the extent groups, whose all logical extents are associated with the physical extents in the first storage device based on the number of accesses included in the logical extent information, and
select an extent group to be subjected to data transfer from a physical extent in the first storage device to a physical extent in the second storage device based on the calculated number of accesses.

7. The tiered storage system of claim 5, wherein the storage controller is configured to update, when the number of logical extents belong to an extent group exceeds a threshold value, the logical extent information based on the link intensity held in the extent management table to divide the extent group into two extent groups.

* * * * *